United States Patent [19]
Duvdevani et al.

[11] Patent Number: 5,435,821
[45] Date of Patent: Jul. 25, 1995

[54] CONTROLLED RELEASE VEGETATION ENHANCEMENT AGENTS COATED WITH SULFONATED POLYMERS, METHOD OF PRODUCTION AND PRCESSES OF USE

[75] Inventors: Ilan Duvdevani, Leonia; Evelyn N. Drake, Bernardsville; Warren A. Thaler, Flemington; Pacifico V. Manalastas, Edison, all of N.J.

[73] Assignee: Exxon Research & Engineering Co., Wilmington, Del.

[21] Appl. No.: 634,363

[22] Filed: Dec. 31, 1990

Related U.S. Application Data

[63] Continuation of Ser. No. 110,264, Oct. 20, 1987, abandoned, which is a continuation-in-part of Ser. No. 855,349, Apr. 24, 1986, which is a continuation-in-part of Ser. No. 808,034, Dec. 12, 1985, Pat. No. 4,701,204.

[51] Int. Cl.⁶ .................... C05C 9/00; B32B 5/16; B32B 27/06
[52] U.S. Cl. ......................... 71/28; 71/64.07; 71/64.11; 71/902; 504/101; 504/116; 428/334
[58] Field of Search .............. 71/1, 28, 64.07, 902, 71/64.11, 64.13; 504/101, 116

[56] References Cited

U.S. PATENT DOCUMENTS

| | | | |
|---|---|---|---|
| 3,388,990 | 6/1968 | Maruta et al. | 71/64.12 |
| 3,544,500 | 12/1970 | Osmond et al. | 428/402.24 |
| 4,015,970 | 4/1977 | Hennart | 71/11 |
| 4,019,890 | 4/1977 | Fujita | 71/64.11 |
| 4,083,712 | 4/1978 | Corte et al. | 71/28 |
| 4,092,285 | 5/1978 | Leo et al. | 523/334 |
| 4,111,203 | 8/1978 | Theeuwes | 604/892.1 |
| 4,118,359 | 10/1978 | Brenner | 524/214 |
| 4,455,344 | 6/1984 | Matsuyama et al. | 428/327 |
| 4,500,336 | 2/1985 | Van Hijfte et al. | 71/29 |
| 4,508,761 | 4/1985 | Miyashi et al. | 427/221 |
| 4,517,250 | 5/1985 | Agarwal et al. | 428/483 |
| 4,560,400 | 12/1985 | Allan et al. | 71/29 |
| 4,568,559 | 2/1985 | Nuwayser et al. | 427/2.15 |
| 4,701,204 | 10/1987 | Duvdevani | 71/28 |
| 4,988,377 | 1/1991 | Manalastas et al. | 71/28 |

FOREIGN PATENT DOCUMENTS

| | | |
|---|---|---|
| 1115890 | 1/1982 | Canada . |
| 1141558 | 2/1983 | Canada . |
| 783006893 | 6/1979 | European Pat. Off. . |
| 813013992 | 10/1981 | European Pat. Off. . |
| 0211255 | 2/1987 | European Pat. Off. . |
| 861093193 | 2/1987 | European Pat. Off. . |
| 47-41812 | 12/1972 | Japan . |
| 57-149886 | 9/1982 | Japan . |
| 45188 | 3/1983 | Japan . |
| 7202037 | 8/1972 | Netherlands . |
| 1025694 | 4/1966 | United Kingdom . |
| 1156653 | 7/1969 | United Kingdom . |
| 8000668 | 1/1981 | WIPO . |
| 8000979 | 11/1987 | WIPO . |

Primary Examiner—Ferris Lander

[57] ABSTRACT

A vegetation enhancement composite including a vegetation enhancement agent consisting of a first member selected from the group consisting of at least one macronutrient, micronutrient, nitrogen fertilizer including an inhibitor of nitrification activity, slow release fertilizer, and mixtures of such members and a pesticide; and at least one first controlled release film including a sulfonated polymer coating at least a portion of a surface of the vegetation enhancement agent. A method of producing controlled release fertilizers involving providing a vegetation enhancement agent consisting of a first member selected from the group consisting of at least one macronutrient, micronutrient, nitrogen fertilizer including an inhibitor of urease, nitrogen fertilizer including an inhibitor of nitrification activity, slow release fertilizer, and mixtures of such members and a pesticide; and coating at least one surface of the vegetation enhancement agent with a sulfonated polymer dissolved in a solvent system including an organic liquid to form a controlled release coating on the vegetation enhancement agent. An agricultural process involving the application of a vegetable enhancement agent coated with a sulfonated polymer to plant growth medium to stimulate germination and enhance growth of vegetable matter.

100 Claims, 1 Drawing Sheet

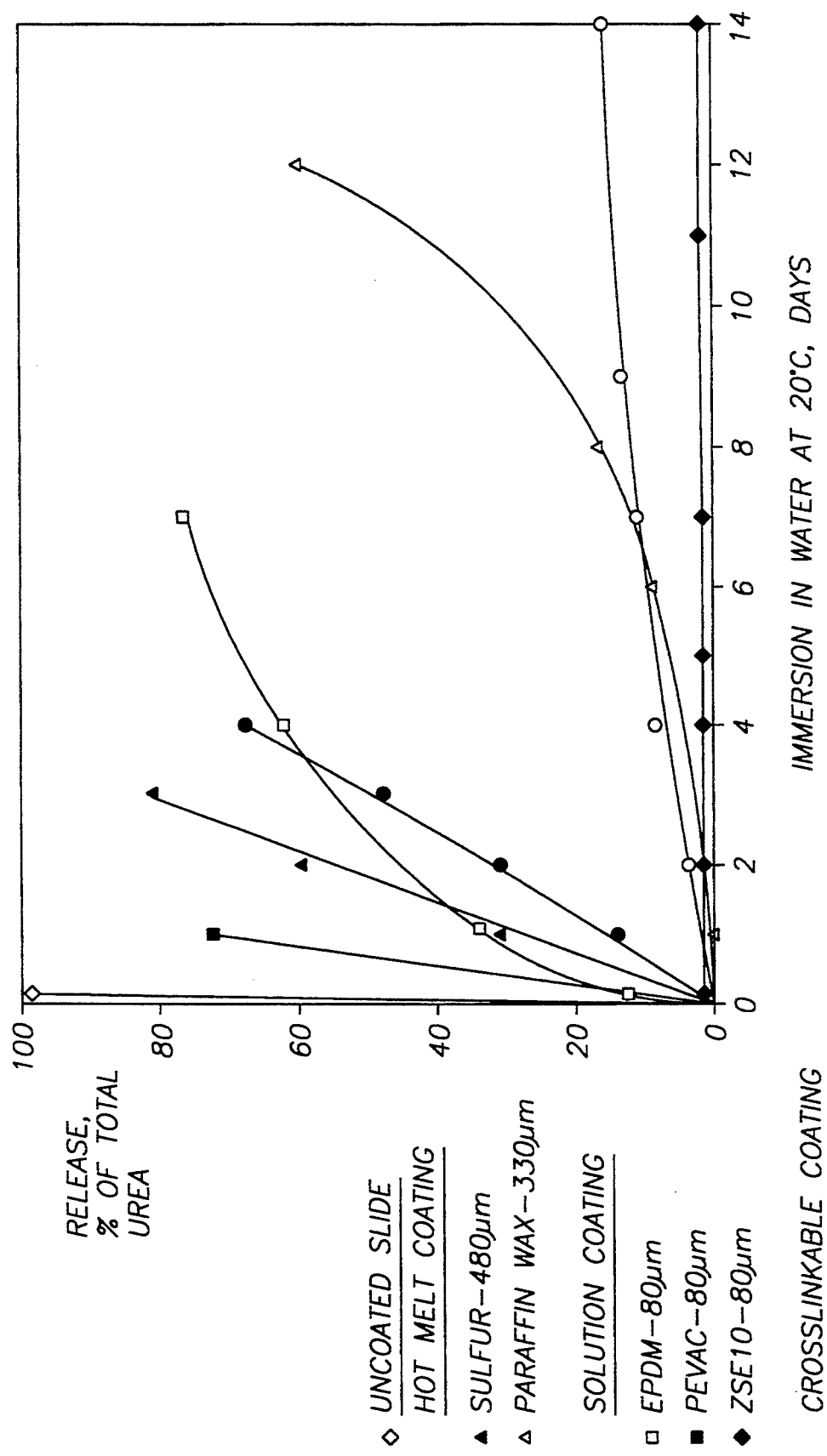

CONTROLLED RELEASE VEGETATION ENHANCEMENT AGENTS COATED WITH SULFONATED POLYMERS, METHOD OF PRODUCTION AND PRCESSES OF USE

RELATED APPLICATIONS

This is a continuation of application Ser. No. 07/110,264 filed Oct. 20, 1987 abnd.; which is a continuation-in-part of U.S. Ser. No. 06/855,349, filed Apr. 24, 1986, which is a Continuation-in-part application of U.S. Ser. No. 808,034 filed Dec. 12, 1985 now U.S. Pat. No. 4,701,204, abandoned, the disclosures of which are hereby incorporated in their entirety by reference thereto.

This application also relates to U.S. Ser. No. 07/634,362 (Ref: P5996), filed concurrently herewith, commonly owned with the present application, the disclosure of which is hereby incorporated in its entirety by reference thereto.

BACKGROUND OF THE INVENTION

1. Field of the Invention

The present invention relates to controlled release fertilizers and particularly to fertilizer-pesticide compositions. The invention is more particularly directed to fertilizers and fertilizer-pesticide compositions to which thin or ultrathin films or coatings of sulfonated polymers have been applied as an improved controlled release agent. Related to this, the present invention is directed to methods for producing fertilizer and fertilizer-pesticide composites coated with sulfonated polymers in addition to agricultural processes involving the use of such coated fertilizers and fertilizer-pesticide composites. In this regard, agricultural processes in which the fertilizer and fertilizer-pesticide composites coated with sulfonated polymers in accordance with the present invention may be applied include processes for enhancing vegetation including plant growth stimulation and regulation as well as stimulation of seed germination.

2. Discussion of Background and Material Information

Carbon, hydrogen, oxygen, nitrogen, phosphorus and sulphur are the primary elements essential to plant growth. Soils contain all of these elements in addition to other macro and micronutrients that enhance plant growth. Typically, however, such elements are seldom present in the soil in sufficient quantity or in forms that can support maximum plant productivity and yield. Therefore, fertilizers having specific chemical formulations and in pre-determined amounts must be added to enrich the soil to ensure maximum plant yield. The amount and form of the fertilizer added are pre-determined by chemically assaying the amount and availability of the required nutrient(s) in the soil, for example, as disclosed by Methods of Soil Analysis. 1982. Amer. Soc. Agronomy, Madison, Wisc. Thus, appropriate fertilizer is added in amounts calculated to ensure the required plant yield based on known fertilizer response curves established by extensive agronomic testing for the particular plant and plant growth environment.

Fertilizers containing nitrogen, phosphorus, sulphur and/or potassium, by way of example, may be applied as solid granules or in liquid form. These primary fertilizers may be supplemented with certain trace elements such as copper, iron, manganese, zinc, cobalt, molybdenum, boron usually supplied as oxides or salts containing the elements in the cationic form. Suitable salts are, for example, sulphates, nitrates, chlorides, molybdates or borates. The difference between trace element deficiency and toxicity, however, is but a few parts per million as measured by the concentration of the element in the soil. Moreover, the efficiency of utilization of fertilizers, i.e., the percent uptake of the applied fertilizers is notoriously low. In this regard, chemical, biological and physical processes compete with the plant for the added fertilizer nutrients usually to the detriment of plant productivity. In addition, nitrogen fertilizers added to the soil may be leached into groundwaters, chemically immobilized into clay minerals, chemically removed by volatilization of ammonia, biologically removed from the soil by denitrification to dinitrogen and nitrous oxide gases or immobilized into the active microbial biomass. These competing and simultaneous occurrances result in fertilizer use efficiency of nitrogen often being less than 50%. Thus, when 100 kg N/ha is added to the soil, the plant actually "sees" only 50 kg N/ha. Although most soils contain high levels of phosphorus, it is chemically immobilized as calcium phosphates, e.g. in soils of pH >7.0 or iron and aluminum phosphates, e.g. in soils of pH <5.0, and is thus not plant-available. Fertilizer phosphorus applied to these soils, however, is rapidly immobilized resulting in fertilizer use efficiencies seldom exceeding 30%.

If the release of nutrients from fertilizers could be controlled to more closely match the actual physiological requirements of the plant for the nutrient and if temporary or permanent losses of the fertilizer nutrients could be minimized if not eliminated, several advantages would accrue:

i) less fertilizer would be required to achieve the same plant yield,
ii) the same amount of fertilizer could be applied resulting in higher yields and concomitant lower per unit plant production costs;
iii) less water-soluble nitrogen would leach into groundwaters thus minimizing ground-water pollution; and/or
iv) less nitrogenous gases would evolve into the atmosphere thus minimizing damage to the fragile ozone layer.

Although it is known to protect solid substrates, such as pipes, slabs, sheets and the like from the external environment with the use of barrier or protective coating materials, this technology has not been applied in accordance with the present invention, particularly with respect to agricultural products. In conventional applications, however, polymers or other organic materials are widely used as coatings to provide protection from water or moisture. For cost effectiveness these materials are typically applied as thin films. The thickness of the film depends upon the desired degree of water protection. The thicker the film, the more likely that water penetration would be slowed down. In practice, applying an effective thin coating is difficult because of the various stresses tending to make the film discontinuous (e.g., film-rupture, pin holes). Films will rupture when a threshold stress is exceeded. The lateral stress tending to rupture a film is inversely proportional to an exponential power of the film thickness. The thinner the film, the more easily it will rupture. To provide film strength current practice requires the establishment of crosslinks in the coating by curing. Crosslinking, i.e. curing, can also improve the coating's resistance to water. Thin films which consist of molecules in relatively random configurations with a high degree of entanglements are superior to films containing molecules in relatively coiled states with few molecular entanglements. Accordingly, polymers containing associating ionic groups, i.e. ionomers, which have a high degree of molecular interactions make excellent protective films.

There are many applications for thickened or gelled solutions of polymers in inorganic liquids. There are also a number of physical and chemical techniques for preparing such systems. The present invention, however, is concerned with polymeric coatings having improved properties which have been found to be particularly suitable for application to agricultural products, such as fertilizers, pesticides, herbicides, insecticides, bacteriocides, fungicides, nematicide, sporicides, and the like, in addition to combinations thereof.

SUMMARY OF THE INVENTION

In general, the present invention, therefore, relates to coating vegetation enhancement agents, such as fertilizers and fertilizer-pesticide combinations, with thin or ultra-thin coatings of sulfonated polymers to result in controlled release fertilizers and fertilizer-pesticide combinations having improved barrier properties, as well as agricultural processes involving methods of using fertilizers and fertilizer-pesticide combinations coated with sulfonated polymers in accordance with the present invention so as to decrease dissolution of soluble fertilizer components, increase fertilizer use efficiency and substantially decrease losses of the added fertilizer from the plant growth medium due to biological, chemical, or physical processes competing with the plant for the said nutrients.

The present invention is directed to a vegetation enhancement composite which includes a vegetation enhancement agent consisting of a first member selected from the group consisting of at least one macronutrient, a nitrogen fertilizer including a member selected from the group consisting of an inhibitor of urease and an inhibitor of nitrification activity, and a slow release fertilizer, and mixtures of a pesticide and a member selected from the group consisting of at least one macronutrient, micronutrient, a nitrogen fertilizer including an inhibitor of urease and an inhibitor of nitrification activity, and a slow release fertilizer; and at least one first controlled release film comprising a sulfonated polymer extending over at least a portion of a surface of the vegetation enhancement agent, wherein the vegetation enhancement agent is in a substantially solid form having a dimension within the range of about 1 to about 10 mm, such as particles wherein the dimension is a major dimension of the particles. Preferably the particles are granules and the dimension is the diameter of the granules preferably is within the range of about 1 to about 6 mm, and more preferably is about 1.0 to about 3.5 mm, and most preferably is about 1.5 to 3.0 mm.

The composite of the present invention, as described above, preferably further includes at least one second controlled release film superposed with respect to the first controlled release film, wherein the first controlled release film is in direct contact with the vegetation enhancement agent, and preferably forms an exterior surface of the composite.

The vegetation enhancement agent of the present invention, as described above, is preferably a mixture with at least one second member selected from the group consisting of at least one macronutrient, a nitrogen fertilizer including a member selected from the group consisting of an inhibitor of urease and an inhibitor of nitrification activity, and a slow release fertilizer, and mixtures of at least one macronutrient, micronutrient, nitrogen fertilizer including a member selected from the group consisting of an inhibitor of urease and an inhibitor of nitrification activity, a slow release fertilizer, and a pesticide. The second member comprises about 5 to 95% by total weight of the mixture, and preferably the first member comprises 5 to 95% by total weight of the mixture.

In accordance with the present invention, the first controlled release film is a coating which essentially completely encapsulates the vegetation enhancement agent, and is substantially free of orifices so as to physically insulate the vegetation enhancement agent from direct exposure to ambient conditions. The coating may have a thickness of less than about 50 microns, preferably within the range of about 0.5 to about 20 microns. Alternatively, the coating may have a thickness of about 50 to about 200 microns, and preferably within the range of about 100 to about 200 microns. The first controlled release film has a thickness of about 0.5 to about 20 microns, and preferably comprises about 0.1% to about 20% by total weight of the vegetation enhancement agent.

In addition, the present invention is also directed to a method of producing controlled release fertilizers which involves providing a vegetation enhancement agent consisting of a first member selected from the group consisting of at least one macronutrient, a nitrogen fertilizer including a member selected from the group consisting of an inhibitor of urease and an inhibitor of nitrification activity, and a slow release fertilizer, and mixtures of a pesticide, and a member selected from the group consisting of at least one macronutrient, micronutrient, nitrogen fertilizer including a member selected from the group consisting of an inhibitor of urease, and an inhibitor of nitrification activity and slow release fertilizer; and coating at least one surface of the vegetation enhancement agent with a sulfonated polymer dissolved in a solvent system including an organic liquid to form a controlled release coating on the vegetation enhancement agent, preferably wherein the solvent system comprises a cosolvent, such as a polar cosolvent. The cosolvent is preferably a member selected from the group consisting of alcohols, amines, di-functional alcohols, tri-functional alcohols, amides, acetamides, phosphates, lactones, and mixtures thereof, and the cosolvent is preferably a member selected from the group consisting of methanol, ethanol, n-propanol, isopropanol, 1,2 - propane diol, monoethyl ether of ethylene glycol and n- ethylformamide. The cosolvent has a solubility parameter of at least 10.0, and more preferably has a solubility parameter of at least 11.0. The cosolvent preferably comprises from 0.1 to 5.0 weight percent by total weight of sulfonated polymer, organic liquid, and cosolvent. The cosolvent is most preferably isopropanol, and the organic liquid is toluene. The most preferred source of macronutrient is ammonium sulfate.

In accordance with the method of the present invention, the coating is prepared by dissolving an amount of a member selected from the group consisting of a sulfonated polymer and interpolymeric complexes in a solvent system comprises an organic liquid to form a solution with a concentration of 0.1 to 20 weight percent, wherein the polymer is sulfonated polystyrene and the organic liquid is a member selected from the group consisting of benzene, toluene, ethyl benzene, methylethyl ketone, xylene, styrene, ethylendichloride, and methylene chloride. The polymer may also be sulfonated poly-t-butyl-styrene in which case the organic liquid is a member selected from the group consisting of benzene, toluene, xylene, ethyl, benzene, styrene, t-butyl styrene, aliphatic oils, aromatic oils, hexane, heptane, decane, and nonane. In the embodiment where the polymer is sulfonated ethylene-propylene terpolymer, the organic liquid may be a member selected from the group consisting of pentane, aliphatic and aromatic solvent oils, benzene, diesel oil, toluene, xylene, ethyl benzene, pentane, hexane, heptane, octane, isooctane, nonane, decane, aromatic solvents, and ketone solvents. The polymer may be sulfonated styrene-methyl methacrylate copolymer, in which case the organic liquid is a member selected from the group consisting of dioxane, and halogenated aliphatics, wherein the halogenated aliphatics are selected from the group consisting of methylene chloride and tetrahydrofuran. In the embodiment where the polymer is sulfonated polyisobutylene copolymers, the organic liquid is a member selected from the group consisting of saturated aliphatic hydrocarbons, diisobutylene, triisobutylene, aromatic and alkyl substituted aromatic hydrocarbons, chlorinated hydrocarbons, n-butyl ether, n-amyl ether, methyl oleate, aliphatic oils, and paraffinic oils. In the case embodiment where the polymer is sulfonated polyvinyl toluene, the organic liquid is selected from the group consisting of toluene, benzene, xylene, cyclohexane, ethyl benzene, styrene, methylene chloride, ethylene dichloride.

In addition, the present invention is also directed to an agricultural process which involves providing at least one layer of barrier material comprising a first film of sulfonated polymer between a vegetation enhancement agent and vegetable matter to control exposure of the vegetable matter to the vegetation enhancement agent. The vegetation enhancement agent comprises a first member selected from the group consisting of at least one macronutrient, a nitrogen fertilizer including a member selected from the group consisting of an inhibitor of urease and an inhibitor of nitrification activity, and a slow release fertilizer, and mixtures of a pesticide a member selected from the group consisting of at least one macronutrient, micronutrient, nitrogen fertilizer including a member selected from the group consisting of an inhibitor of urease and an inhibitor of nitrification activity, and a slow release fertilizer. Preferably, the vegetation enhancement agent is in the form of particles and the process involves encapsulating the particles with the sulfonated polymer so as to physically insulate the vegetation enhancement agent from ambient conditions as an encapsulated vegetation enhancing agent, wherein the vegetable matter is a member selected from the group consisting of seeds, and plants. Preferably the vegetable matter is seeds, which are preferably selected from the group consisting of oil seeds, fruit seeds, legume seeds, seeds of roots, seeds of tubers, sugar crops seeds, seeds of trees, seeds of ornamental plants, and nut seeds, and more preferably are selected from the group consisting of cereal seeds, wherein the cereal seeds are selected from the group consisting of barley, buckwheat, canarygrass, maize, millet, oats, rice, rye, sundangrass, sorghum, sesame, triticale, and wheat, and most preferably wherein the cereal seeds are wheat seeds. The seeds also may be selected from the group consisting of grass seeds; or may be selected from the group consisting of vegetable seeds; or may be selected from the group consisting of industrial seeds.

The process of the present invention involves exposing the encapsulated vegetation enhancement agent to the vegetable matter, preferably by blending the encapsulated vegetation enhancement agent with the seeds to form a mixture comprising the vegetation encapsulation agent and the seeds, or by introducing the encapsulated vegetation enhancement agent and the seeds into a plant growth media, wherein the plant growth media is a member selected from the group consisting of water, vermiculite, perlite, soil and mixtures thereof, and preferably is soil. The encapsulated vegetation enhancement agent and the seeds are preferably introduced during a single agricultural step to the soil, so as to eliminate the need for post emergence application of vegetation enhancement agents, wherein the vegetation enhancement agent and the seeds are introduced substantially simultaneously into the soil so as to stimulate emergence of the seeds, preferably at a rate to supply nitrogen at a rate in excess of kg/ha and phosphorous at a rate in excess of 30 kg/ha without burning the seeds or preventing subsequent emergence of the seeds.

For purposes of the process of the present invention, as described above, the plant growth media may be a member selected from the group consisting of sand and peat and mixtures thereof. The encapsulated vegetation enhancement agent is preferably applied to the soil at a rate which is at least 10% less than a fertilizer rate determined by a standard soil testing method as being required for the seeds in the soil, and more preferably is as much as 50% less than the fertilizer rate, and most preferably is within the range of 10 to 20% less than the fertilization rate.

For purposes of the process of the present invention, as described above, the soil is a high moisture level soil wherein the moisture level exceeds 22 kPa during at least 50% of the growing season, and the encapsulated vegetation enhancement agent is introduced into the soil prior to a subsequent planting of the seeds, such as in the Fall of a year prior to planting the seeds in the Spring of the following year, or in the Fall of a year during which the seeds are planted.

In accordance with the process of the present invention, as described above, the introduction of the encapsulated vegetation enhancement agent supplies nitrogen at a sufficient rate in timing of release to satisfy the physiological need for nitrogen of the wheat throughout the growing season. In the embodiment where the seeds, cereal seeds and the introduction of the encapsulated vegetation enhancement agent supplies nitrogen at a rate and timing of release essentially coincident with applications of fertilizer prescribed under a standard intensive cereal management program (ICM) thereby eliminating the need for multiple fertilizer applications.

For purposes of the process of the present invention, as described above, the vegetation enhancement agent is in the form of a vegetation enhancement composite comprising a member selected from the group consisting of at least one macronutrient, a nitrogen fertilizer including a member selected from the group consisting of an inhibitor of urease and an inhibitor of nitrification activity, a slow release fertilizer and mixtures of at least one macronutrient, micronutrient, nitrogen fertilizer including a member selected from the group consisting of an inhibitor of urease and an inhibitor of nitrification activity, and slow release fertilizer, and at least one first film comprising the sulfonated polymer coating the vegetation enhancement agent. Preferably the vegetation enhancement agent is in a substantially solid form, which has a dimension within the range of about 1.0 to about 10.0 mm, such as particles, wherein the dimension is a major dimension of the particles, and is about 1.0 to about 6.0 mm, and preferably is within the range of about 1.0 to 3.5 mm; more preferably the particles are granules and the major dimension is the diameter of, about 1.0 to about 6.0 mm.

In accordance with the process of the present invention, as described above, the composite also includes a second film superposed with respect to the first film, wherein the first film is in direct contact with the vegetation enhancement agent, and wherein the first film forms an exterior surface of the vegetation enhancement agent. The vegetation enhancement agent may be in the form of a mixture with at least one second member selected from the group consisting of at least one macronutrient, micronutrient, nitrogen fertilizer including a member selected from the group consisting of an inhibitor of urease, and an inhibitor of nitrification activity, a slow release fertilizer, and mixtures of a pesticide and a member selected from the group consisting of at least one macronutrient, micronutrient, nitrogen fertilizer including a member selected from the group consisting of an inhibitor of urease, and an inhibitor of nitrification activity, slow release fertilizer and a pesticide. Preferably the second member comprises about 5 to 95% by total weight of the mixture, and the first member comprises about 5 to 95% by total weight of the mixture.

Preferably the first film essentially completely encapsulates the vegetation enhancement agent, wherein the first film is substantially free of orifices so as to physically insulate the vegetation enhancement agent from direct exposure to ambient conditions. For the purposes of the process of the present invention, as described above, the first film has a thickness of less than 50 microns, i.e., a thickness of about 0.5 to about 20 microns. However, the first film may have a thickness of about 50 to 200 microns, i.e., a thickness of about 100 to 200 microns. Preferably, the first film comprises about 0.5% to about 20% by total weight of the vegetation enhancement agent.

In accordance with the present invention, as describe above, the sulfonated polymer has a sulfonate content of about 4 to about 200 meq. per 100 grams of the sulfonated polymer, and preferably has a sulfonate content of about 10 to 100 meq. per 100 grams of the sulfonated polymer. The sulfonated polymer used in accordance with the process of the present invention, as described above, has a number average molecular weight within the range of 1,000 to 10,000,000, and preferably within the range of 5,000 to 1,000,000, and more preferably within the range of 1,000 to 100,000. The sulfonated polymer used for purposes of the present invention, as described above, may be a neutralized sulfonated polymer wherein the sulfonate groups are neutralized with a member selected from the group consisting of an ammonium counterion and a metal counterion, wherein the metal counterion is a member selected from the group of transition elements and Groups IA and IIA of the Periodic Table of Elements, or wherein the sulfonate groups are at least 50 mole percent neutralized, and preferably wherein the sulfonate groups are 50 to 100 mole percent neutralized, and more preferably wherein greater than 90 mole percent of the sulfonate groups are neutralized. The neutralized sulfonated polymer may be formed from an elastomeric polymer. For purposes of the process of the present invention, as described above, sulfonated polymer may be selected from the group consisting of sulfonated polystyrene, sulfonated poly-t-butyl-styrene, sulfonated ethylene - propylene terpolymer, sulfonated styrene - methyl methacrylate copolymer, sulfonated polyisobutylene and sulfonated polyvinyl toluene. The sulfonated polymer may also be selected from the group including EPDM terpolymer and Butyl rubber.

In accordance with the present invention, as described above, the first film may include an interpolymeric complex of a neutralized sulfonated polymer and an amine containing polymer, wherein the amine contains polymer containing basic nitrogen atoms, the basic nitrogen content of which ranges from about 4 to about 500 meq. per 100 grams of the amine containing polymer. Preferably the amine-containing polymer is selected from the group containing primary, secondary and tertiary amine units, and more preferably the amine-containing polymer is a copolymer of styrene/vinylpyridine. Preferably wherein the copolymer is styrene-4-vinylpyridine having about 0.5 to 50 mole percent 4-vinylpyridine units.

For purposes of the present invention, as described above, the macronutrients are preferably selected from the group consisting of nitrogen, potassium, phosphorous, sulfur, and calcium. The nitrogen is present in a form selected from the group consisting of ammonium sulphate, ammonium chloride, ammonium nitrate, diammonium phosphate, ammonium phosphate nitrate, monoammonium phosphate, ammonium phosphate sulphate, muriate of potash, sodium nitrate, potassium nitrate, calcium nitrate, urea, and ammonium nitrate-calcium carbonate mixture. The potassium is present in a form selected from the group consisting of potassium nitrate, sulphate of potash, and potassium metaphosphate. The phosphorous is present in a form selected from the group consisting of ammonium phosphate nitrate, ammonium phosphate sulphate, monoammonium phosphate, diammonium phosphate, single superphosphate, triple superphosphate, and potassium metaphosphate. The sulfur is present in a form selected from the group consisting of ammonium sulphate, ammonium phosphate sulphate, sulphate potash, and calcium sulfate. The calcium is present in a form selected from the group consisting of calcium nitrate and calcium sulfate. The micronutrients are provided by members selected from the group consisting a source of boron, a source of copper, a source of manganese, a source of molybdenum, and a source of zinc. The source of boron is a member selected from the group consisting of borax (sodium tetraborate decahydrate), sodium tetraborate pentahydrate, sodium tetraborate-pentaborate, and colemanite. The source of copper is a member selected from the group consisting of cupric oxide, cuprous oxide, cupric sulphate nonahydrate, and ferrous sulphate heptahydrate. The source of manganese is a member selected from the group consisting of manganous carbonate, manganous oxide, manganous-manganic oxide, and manganous sulphate monohydrate. The source of molybdenum is a member selected from the group consisting of ammonium molybdate, sodium molybdate (anhydrous), and molybic oxide. The source of zinc is a member selected from the group consisting of calcined zinc concentrate, zinc carbonate, zinc oxide, and zinc sulphate monohydrate.

For purposes of the present invention, as described above, an inorganic fertilizer is used which is preferably a slow release fertilizer selected from the group consisting of sulphur coated urea, isobutylidene diurea, crotonylidene diurea, urea formaldehyde, trimethylene tetraurea, oxamide, cyanuric acid, ammeline, ammedlide, glycouril, magnesium ammonium phosphate (Mag Amp), guanyl urea sulphate (GUS), guanyl urea phosphate (GUP), thiourea, and henylurea; the inhibitor of urease and inhibitor of nitrification activity are selected from the group consisting of N-Serve (2-chloro-6(trichloromethyl) Pyridine), potassium axide, AM (2-chloro-4-chloro-6-methyl-pyrimidine), thiourea, DCD (Dicyandiamide), ST (sulfa-thiazole), guanylthiourea, PPD (phenylphosphorodiamidate), and CD (carbondisulphide); the macronutrient is provided by members selected from the group consisting of ammonium sulphate, ammonium chloride, ammonium nitrate, ammonium phosphate, nitrate, ammonium phosphate sulphate, sodium nitrate, potassium nitrate, calcium nitrate, ammonium nitrate-calcium carbonate mixture, diammonium phosphate, monoammonium phosphate, muriate of potash, sulphate of potash, single superphosphate, triple superphosphate, and potassium metaphosphate; the pesticide is a member selected from the group consisting of herbicides, insecticides, bacteriocides, fungicides, nematicides and sporicides; the pesticide is selected from the group consisting of herbicides and insecticides; the herbicides are selected from the group consisting of atrazine, triallate, trifluralin, glysophate, glysophote+2, 4-D, sethoxydim, metolachlor, EPTC, EPTC+R25788, metolachlor+atrazine, and metribuzin; and the insecticides are selected from the group consisting of terbufos, fonofos, carbonfuran, and adidarb, most preferably the source of macronutrient is urea.

BRIEF DESCRIPTION OF THE DRAWING

FIG. 1 illustrates a plot of release of urea versus immersion time in water at 37° C. for the thin, sulfonated coatings of the instant invention and control samples.

DETAILED DESCRIPTION

The present invention is more specifically directed to methods for forming a film having improved barrier properties on fertilizers and fertilizer-pesticide compositions, preferably in solid granular form having a diameter within the range of 1.0–10.0 mm, from an organic solution of a sulfonated polymer, and preferably a co-solvent, as well as the resultant fertilizer and fertilizer-pesticide combinations coated with sulfonated polymers.

The discovery of the film-forming properties of sulfonated ionomers has made possible the extension of their use to the coating of fertilizers for this purpose. In controlled release fertilizer applications, coatings of sulfonated ionomers have been found to act as barriers to water-soluble constituents of the fertilizers, shielding them from premature release in plant growth media for periods ranging from several days to several years depending on the polymer chemistry and the coating thickness. Further, the thinness of the coating ensures a chemical nutrient analysis not significantly different from that of the uncoated fertilizer. Commercial coated fertilizers, because of their thick coatings, e.g. 20 weight percent, have been analyzed to contain significantly less nitrogen than uncoated equivalents, e.g., sulphur-coated urea is 37% nitrogen while uncoated urea is 46% nitrogen.

For purposes of the present invention, it is important that the coating be as thin as possible both to maintain a high nutrient analysis and to minimize the cost of the coating of the fertilizer. Thus, the coating concentration is dictated not only by economic considerations but also by the required performance. In most cases, the performance requirements include the control of release or dissolving property of the fertilizer achievable with the application of coatings free of fine pinholes or any other defects. Although, the coating of sulfonated polymer in accordance with the present invention may be applied as thick as 50–200 microns, and preferably 100–200 microns, the present invention is a substantial improvement over conventional coated fertilizers because thinner coatings can be applied with fewer defects.

In this regard, with the discovery of sulfonated ionomer coatings, the application of thin, i.e., <50 micron, substantially defect-free films on fertilizers have now been achieved. The present invention, therefore, is based on the discovery that a solution of a sulfonated polymer, i.e. a sulfonated polymer salt, can meet the requirements of an improved thin coating, i.e., preferaebly in the range of 0.5 to 20 microns, for fertilizers. Related to this, the sulfonated polymer coating comprises 0.1 to about 20% by total weight of the fertilizer or fertilizer/pesticide combination.

The vegetation enhancement agent, i.e., fertilizer or fertilizer/pesticide combination, to which the present invention is applicable is preferably in a substantially solid form, i.e., particles, having a dimension, and preferably a major dimension, within the range of about 1.0 to 10.0 mm. Preferably, the fertilizer particles are granules having a diameter within the range of about 1.0 to 6.0 mm and most preferably about 1.0 to about 3.5 min. Commercial fertilizer granules typically have a diameter of about 2.3 mm, although particles, such as granules having a diameter as large as about 6 mm, have been found to be useful, particularly for purposes of aerial application, for example used in the forestry industry.

Although the present invention has been described in connection with coating a vegetation enhancement agent, such as fertilizers/pesticide combinations, with a layer or film of sulfonated polymer, it should be understood that the present invention may also be used to coat a previously coated fertilizer or fertilizer/pesticide combination, such as conventional slow release fertilizers. Alternatively, fertilizers coated with sulfonated polymer in accordance with the present invention may also be coated with a conventional slow release coating, to which additional applications of the sulfonated polymer films or coatings in accordance with the present invention may be applied. Thus, a multiple-coated fertilizer or fertilizer/pesticide combination may be produced in accordance with the present invention. In this regard, however, it is preferred that the film or coating of the sulfonated polymer be either in direct contact with the vegetation enhancement agent, or form the exterior surface of the coated composite.

The present invention is also directed to agricultural processes, such as those for the enhancement of vegetation or vegetable matter. As used herein, vegetable matter is meant to be a division of nature comprising the plant kingdom as distinguished from matter of animal and mineral origin. Thus, vegetable matter includes seeds and plants, including seedlings, young plants, or any organ from which a plant can be generated, including naturally propulgated vegetable matter in addition to genetically engineered vegetable matter.

More specifically, the process of the present invention is directed to the stimulation of the germination and growth of a seed or a plant, including seedlings, young plants or any organ from which a plant can be generated, which involves the step of exposing the vegetable matter, e.g., the seed or plant, and/or the plant growth medium, i.e., soil, water and the like, either before, simultaneously with, or after the addition of the seed or plant to the plant growth medium to a fertilizer and/or fertilizer-pesticide combinations having a thin layer of a sulfonated polymer coated thereon.

In addition, the process also relates to the intimate admixing of fertilizer, such as urea, ammonical, phosphorus and/or sulphur fertilizers, alone or combined with pesticides, with a seed or plant, or other vegetable matter, as defined herein, without damage to the same in a plant growth medium which involves the steps of:

1) admixing or otherwise contacting a fertilizer, preferably in solid granular form, having a thin, sulfonated polymer film or coating thereon with a seed or plant;
2) placing such a fertilizer in close proximity to the seed or plant with or without a separation of time between the fertilizer and seeding steps.

In this regard, it has been discovered that fertilizers with thin films or coatings of sulfonated polymers, for example urea and ammonium sulfate, can be placed with the seed at the rate exceeding 25 kgN/ha without damage to the seed, seedlings, or young plants. Thus, the fertilizer and fertilizer/pesticide combinations having thin films or coatings of sulfonated polymers have been found to be extremely effective in stimulating seedling emergence and early plant growth by permitting the placement of urea fertilizers with the seed at the time of planting. It has been discovered that the thin sulfonated polymer film or coating slows the release of urea and ammonium to a sufficient extent to prevent burning of the seed or young seedling to which such a fertilizer is applied. In contrast to conventional slow release fertilizers, for example, urea coated with a thin film of sulfonated polymer in accordance with the present invention can be applied to the plant growth media at a rate in excess of 25 kgN/ha without raising the pH of the seed in the plant media a sufficient extent to burn the seed and prevent emergence.

Although phosphorous fertilizers are routinely seed-placed and have been found to be effective in stimulation of emergence and yield, known as the "pop-up" effect, seed-placing has not believed to have been possible with conventional ammonical nitrogen fertilizers prior to the development of the sulfonated polymer coated fertilizers and fertilizer/pesticide combination in accordance with the present invention. Thus, the sulfonated polymer coated fertilizers and fertilizer/pesticide combinations in accordance with the present invention have been found to be particularly advantageous in promotion of emergence, and early growth stimulation of seedlings, while permitting placement of the fertilizer with the seed.

Although the coated fertilizer of the present invention has been found to be particularly advantageous in permitting the introduction of nitrogen fertilizers and fertilizer/pesticide combinations simultaneously into the soil with the seed so as to stimulate emergence of seedlings and the growth of plants, fertilizers coated in accordance with the present invention may also preferably contain a source of sulfur and phosphorous, in which case the fertilizer may be applied so as to supply nitrogen at a rate in excess of 25 kg/ha, sulfur in excess of 15 kg/ha, and phosphorous at a rate in excess of 30 kg/ha without burning the seeds or preventing subsequent emergence of the seedlings.

The present invention, therefore, is particularly suitable for replacing split or multiple applications of uncoated fertilizers to ensure that the available plant nutrient matches the physiological need of the crop for the same. In this regard, plants do not require all of their nitrogen at one time; for example, wheat requires over 35% of its nitrogen between booting and the soft dough stage. Typically uncoated fertilizers are applied in split applications at key physiological plant growth stages such as tillering, stem elongation, booting and seed filling to ensure that the nitrogen is available to the plant as required. Controlled release nitrogen, therefore, is effective in replacing split fertilizer applications. Controlled release nitrogen holds the nitrogen in a form until the nitrogen is needed by the plant. It has been discovered that the sulfonated polymer coated fertilizer and fertilizer/pesticide combinations in accordance with the present invention are particularly suitable for introduction with the seed and/or into the plant growth median during a single agricultural step so as to eliminate the need for post emergence application of the fertilizer.

The fertilizer and fertilizer/pesticide combination coated with thin films of sulfonated polymers in accordance with the present invention, however, may also be introduced into the soil prior to a subsequent planting of the seeds. For example, the coated fertilizer of the present invention may be introduced into the soil in the Fall of a year prior to planting wheat in the Spring of the following year, without appreciable loss of nutrients. Thus the coated fertilizer of the present invention may be formulated so as to supply nitrogen at a sufficient rate and timing of release to satisfy the physiological need for nitrogen of the wheat beginning in the Spring of the year when the wheat is sown through the growing season. The coated fertilizer of the present invention may also be applied in a single application to supply nitrogen at a rate and timing of release essentially the same as provided by separate applications of fertilizer prescribed under a standard intensive cereal management program (ICM) thereby eliminating the need for multiple fertilizer applications which would otherwise be required by such an ICM program.

In view of the foregoing, it is believed that the sulfonated polymer coating of fertilizers in accordance with the present invention, and particularly phosphate fertilizers, would effectively reduce the chemical immobilization of phosphorous as calcium or aluminum/iron-phosphate, thereby making fertilizer phosphorous more plant available.

In accordance with the present invention, fertilizers and fertilizer/pesticide combinations with thin films or coatings of sulfonated polymers permits the fertilizer to be applied to the soil at a rate which is at least 10% less than a fertilization rate for a fertilizer not coated in accordance with the present invention determined by a standard soil testing method as being required for the particular crop in the soil of the particular region. Although the rate of fertilizer reduction may be as much as about 50% less than the fertilization rate otherwise required, typically the rate is reduced within the range of about 10-20% less than a conventional fertilization rate.

It has also been discovered that fertilizers and fertilizer/pesticide combinations coated with thin films of sulfonated polymer experience reduced nitrogen losses. This is particularly true for urea and ammonium sulfate. Conventionally, nitrogenous fertilizers added to moist soils, i.e., soils where the moisture levels exceed ⅔ of field capacity, i.e., 22 kPa, are subject to a loss of nitrogen due to a variety of factors including: leaching into ground waters, the denitrification to $N_2O$ and/or $N_2$ gas, volatilization of ammonia gas, and immobilization into the active microbial biomass. It has been discovered that fertilizers coated with thin films of sulfonated polymer in accordance with the present invention experience substantially reduced losses of nitrogen by controlling the release of nitrogen by the coated fertilizer; thus, the amount of fertilizer nitrogen available at any particular time which would be subjected to the previously mentioned deleterious effects is minimized. An advantage of the present invention, therefore, is a reduction in the losses of, for example, ammonical nitrogen by chemical, physical and biological occurrences. Thus, the present invention has been found effective in increasing plant yields because more nitrogen is available for the needs of the plant, while decreasing pollution of ground water with fertilizer-derived nitrates, decreasing destruction of the ozone layer of the atmosphere due to fertilizer-derived $N_2O$, and increasing residual nitrogen to benefit subsequent crops planted during the normal course of agricultural rotation.

The component materials of the controlled release coatings of the present invention generally include a water insoluble sulfonated polymer dissolved in an organic solvent system to form a solution with a concentration level within the range of about. 0.1 to 20 weight percent and preferably about 0.5 to 6.0 weight percent.

The solvent system may include an organic solvent with or without a polar cosolvent, such as alcohol or amine. The solvent can be an organic liquid which is capable of dissolving the polymeric backbone of the sulfonated polymer.

The water insoluble sulfonated polymers of the present invention comprise from about 4 to about 200 milliequivalents (meq.) of pendant sulfonate groups per 100 grams of polymer, and preferably from 10 to 100 meg. pendant sulfonate groups.

In most instances, the sulfonates utilized in the present invention are acids or are neutralized with metal counterions, such as elements from Groups IA and IIB or with transition elements selected from Groups IVA, VA, VIA, VIIA, VIIIA, IB, and IIB of the Periodic Table of Elements, and lead, tin, and antimony, as well as ammonium and amine counterions.

Sulfonated polymers which are suitable for purposes of the present invention include both plastic and elastic polymers. Specific polymers include sulfonated polystyrene, sulfonated methylstyrene, sulfonated copolymer of styrene-t-butyl styrene, styrene-methyl styrene, styrene-isobutylene, sulfonated ethylene copolymers, sulfonated atactic propylene polymers and propylene copolymers, sulfonated styrene/acrylonitrile copolymers, sulfonated styrene/methyl methacrylate copolymers, sulfonated block copolymers of styrene/ethylene oxide, acrylic acid copolymers with styrene, sulfonated isobutylene isoprene copolymers (Butyl rubber), sulfonated ethylene-propylene terpolymers, sulfonated isoprene styrene or butadiene styrene or butadiene styrene- block copolymers and the sulfonated hydrogenated block copolymers. Preferred sulfonated polymers of the present invention are ethylene-propylene terpolymers, Butyl rubber and poly-stryrene, with the ethylene-propylene terpolymers and polystyrene being more preferred. Most preferred sulfonated polymers are ethylene-propylene.

The sulfonated polymers of the present invention may vary in number average molecular weight within the range from about 1,000 to 10,000,000, preferably 5,000 to 1,000,000, more preferably from 10,000 to 600,000. These polymers may be prepared by methods known in the art, for example, see U.S. Pat. No. 3,642,728, commonly owned with the present application, the disclosure of which is hereby incorporated by reference thereto. Preferred sulfonated polymers for use in the present invention, which are sulfonated ethylene propylene terpolymers, may be prepared by the procedures described in U.S. Pat. No. 3,870,841, commonly owned with the present application, the disclosure of which is hereby incorporated by reference thereto.

Neutralization of the cited polymers with appropriate metal hydroxides, metal acetates, metal oxides, or ammonium hydroxide, and the like can be effected by means well known in the art. For example, the sulfonation process with Butyl rubber, containing 0.3 to 1.0 mole percent unsaturation, can be performed using a suitable solvent, such as hexane, with acetyl sulfate as the sulfonating agent, as described in U.S. Pat. No. 3,836,511, commonly owned with the present application, the disclosure of which is hereby incorporated by reference thereto. The resulting sulfonic acid derivative can then be neutralized with a number of different neutralization agents, such as sodium phenolate and similar metal salts. The amounts of such neutralization agents employed will normally be stoichiometrically related to the amount of free acid in the polymer, in addition to any unreacted reagent which is still present. It is preferred to use 10% more neutralizing agent than required to ensure full neutralization. The additional amount of such neutralization agent should be sufficient to effect at least 50 percent neutralization of the sulfonic acid groups present in the polymer, preferably at least 90 percent, and most preferably essentially complete neutralization of such acid groups should be effected. Thus, the degree of neutralization of said sulfonate groups may vary from essentially none, i.e., the free acid form, to greater than 90 mole percent or 100 mole percent, and preferably about 50 to 100 mole percent. With the utilization of neutralized sulfonates in this present invention, it is most preferred that the degree of neutralization be substantially complete, i.e., with no substantial free acid present and without substantial excess of the base, other than that needed to ensure neutralization. It has been found that the neutralized sulfonates possess greater thermal stability compared to their acid form. Thus, it is preferred that the polymers which are normally utilized in the present invention comprise substantially neutralized pendant groups and, thus, an excess of the neutralizing material may be utilized without adversely affecting the results for purposes of the present invention.

The sulfonated polymers of the present invention may be neutralized prior to incorporation into the previously mentioned organic solvent or by neutralization of the acid form in situ. Preferably the acid derivative is neutralized immediately after preparation. For example, if the sulfonation of an EPDM terpolymer is conducted in solution, then the neutralization of that acid derivative can be conducted immediately following the sulfonation procedure. The neutralized polymer may then be isolated by means well known to those skilled in the art, i.e., coagulation, steam stripping or solvent evaporation, because the neutralized polymer has sufficient thermal stability to be dried for employment at a later time in the process of the present invention. It is well known that some unneutralized sulfonic acid derivatives do not possess good thermal stability and the above operations avoid that problem.

Specific examples of organic liquids to be employed as solvents with the various types of polymers are:

| SOLUTIONS | |
|---|---|
| Polymer | Organic Liquid |
| sulfonated polystyrene | benzene, toluene, ethyl benzene, methylethyl ketone, xylene, styrene, ethylendichloride, methylene chloride. |
| sulfonated poly-t-butyl-styrene | benzene, toluene, xylene, ethyl benzene, styrene, t-butyl styrene, aliphatic oils, aromatic oils, hexane, heptane, decane, nonane. |
| sulfonated ethylene-propylene terpolymer | pentane, aliphatic and aromatic solvent oils, such as Solvent "100 Neutral", "150 Neutral", and similar oils, benzene, diesel oil, toluene, xylene, ethyl benzene, pentane, hexane, heptane, octane, isooctane, nonane decane aromatic solvents, ketone solvents. |
| sulfonated styrene-methyl methacrylate copolymer | dioxane, halogenated aliphatics, e.g., methylene chloride, tetrahydrofuran. |
| sulfonated polyisobutylene | saturated aliphatic hydrocarbons, dissobutylene, triisobutylene, aromatic and alkyl substituted aromatic hydrocarbons, chlorinated hydrocarbons, n-butyl ether, n-amyl ether, methyl oleate, aliphatic oils, oils predominantly paraffinic in nature and mixtures containing naphthenic hydrocarbons. "Solvent 100 Neutral," "Solvent 150 Neutral," and all related oils, low molecular weight polymeric oils such as squalene, while oils, and process oils having 60 percent or less aromatic content. |
| sulfonated polyvinyl toluene | toluene, benzene, xylene, cyclohexane, ethyl benzene, styrene, methylene chloride, ethylene dichloride. |

Another system suitable for purposes of forming a film or coating on vegetable enhancement agents in accordance with the present invention is a polymer system including a transition element neutralized sulfonated polymer complexed with amine containing polymer, e.g., an interpolymer complex of zinc sulfonated EPDM and styrene vinyl pyridene. In this regard, the film may be composed of at least one member selected from the group consisting of an interpolymeric complex of a neutralized sulfonated polymer, and an amine containing polymer wherein the amine containing polymer contains basic nitrogen atoms such that the basic nitrogen content ranges from about 4 to about 500 meq. per 100 grams of the amine containing polymer, preferably wherein the amine-containing polymer is selected from the group containing primary, secondary and tertiary amine units. In this regard, the amine-containing polymer may be a copolymer of styrene/vinyl-pyridine, such as styrene-4-vinylpyridine having about 0.5 to 50 mole percent 4-vinylpyridine units.

In order to reduce the viscosity of organic solutions of the sulfonated polymer so as to be able to employ the organic solution in a coating process, a polar cosolvent may be added to the organic solution of the sulfonated polymer to solubilize the pendant ionomeric groups. In this regard, the cosolvent is useful in breaking up associated domains resulting from aggregation of ionic species. The polar cosolvents suitable for this purpose should have a solubility parameter of at least 10.0, preferably at least 11.0 and may include from 0.01 to 15.0 weight percent, preferably 0.1 to 5.0 weight percent of the total mixture of organic liquid, water insoluble ionomeric polymer and polar cosolvent. Normally, the polar cosolvent will be a liquid at room temperature; however, this is not a requirement. It is also preferred, but not required, that the polar cosolvent be soluble or miscible with the organic liquid at the levels employed for purposes of this invention. The polar cosolvent may be selected from the group consisting essentially of alcohols, amines, di- or tri-functional alcohols, amides, acetamides, phosphates, or lactones and mixtures thereof. Preferred polar cosolvents are aliphatic alcohols, preferably selected from the group consisting of methanol, ethanol, n-propanol, isopropanol, 1,2-propane diol, monoethyl ether of ethylene glycol and n-ethylformamide. The most preferred solvent for coating solutions is toluene and the most preferred polar cosolvent is isopropanol.

The coatings of the present invention are formed by applying the organic solution of the sulfonated polymer over the substrate, i.e., a fertilizer or fertilizer/pesticide combination, at any temperature suitable for the purpose, for example ambient temperature or a temperature within the range of 50°-80° C., by either dip-coating, spray-coating or other technique, such as brushing, for spreading a thin coating of the elastomer on the substrate. Preferred temperatures for purposes of this application are within the range of 30° to 60° C.

The organic solvent system is then permitted to evaporate with or without the aid of forced drying gas, such as air or nitrogen gas. This step is called the drying process. The drying gas temperature can be any temperature suitable for the purpose. For example, the drying gas temperature can be about ambient temperature or about the boiling point of the organic solvent system. After drying, the thickness of the applied coating should be 0.5 to 200 microns. Preferred is a coating thickness of less than 50 microns, with a coating thickness of 0.5 to 10 microns being most preferred, for both performance and economic reasons. To control the thickness of the applied coating, the solution concentration of the sulfonated polymeric is applied at any concentration up to the solubility limit of the polymer in solution for the polymer-solvent system selected, which is within the skill of one in the art. For example, for sulfonated ethylene-propylene polymer in a toluene/isopropanol solvent system the polymer concentration could be 0.1 to 20 weight percent and preferably at 0.5 to 6 weight percent. The coating solution of the sulfonated polymer can be applied in single or multiple layers, depending on the desired coating thickness. In any instance, the organic solvent system is evaporated after the application of each layer. The sulfonated polymer coating can be applied over the substrate of interest or over a previous coating. In the latter case, such practice can modify or improve the performance of the coating system.

The sulfonated polymer coating can be used as a barrier to create desired slow release for many types of fertilizers, either individually and/or in mixtures, suitable for purposes of the present invention including by way of example:

MACRONUTRIENTS

Nitrogen, for example provided by:
 Ammonium sulphate
 Ammonium chloride
 Ammonium nitrate
 Diammonium phosphate
 Ammonium phosphate nitrate
 Monoammonium phosphate
 Ammonium phosphate sulphate
 Sodium nitrate
 Potassium nitrate
 Calcium nitrate
 Urea
 Ammonium nitrate-calcium carbonate mixture
Potassium, for example provided by:
 Potassium nitrate
 Sulphate of potash
 Muriate of potash
 Potassium metaphosphate
Phosphorous, for example provided by:
 Ammonium phosphate nitrate
 Ammonium phosphate sulphate
 Monoammonium phosphate
 Diammonium phosphate
 Single superphosphate
 Triple superphosphate
 Potassium metaphosphate
Sulfur, for example provided by:
 Ammonium sulphate
 Ammonium phosphate sulphate
 Sulphate potash
 Calcium sulfate
 Ammonium bisulphite
 Ammonium phosphate
 Ammonium sulphate-nitrate
 Ammonium polysulphide
 ammonium thiosulphate
 Ferrous sulphate
 Gypsum
 Kalinite
 Leonite
 Magnesium sulphate
 Polyhalite
 Pyrite
 Schoenite
 Sodium sulphate
 Sulphur
 Sulphur dioxide
 Single superphosphate
 Urea sulphur
 Zinc sulphate
Calcium, for example provided by:
 Calcium nitrate
 Calcium sulfate
 Calcium chloride

MICRONUTRIENTS

Boron as:
 Borax (sodium tetraborate dec,hydrate)
 Sodium tetraborate pentahydrate
 Sodium tetraborate-pentaborate
 Colemanite
Copper as:
 Cupric oxide
 Cuprous oxide
 Cupric sulphate nonahydrate
 Ferrous sulphate heptahydrate
Manganese as:
 Manganous carbonate
 Manganous oxide
 Manganous-manganic oxide
 Manganous sulphate monohydrate
Molybdenum as:
 Ammonium molybdate
 Sodium molybdate (anhydrous)
 Molybic oxide
Zinc as:
 Calcinated zinc concentrate
 Zinc carbonate
 Zinc oxide
 Zinc sulphate monohydrate Conventional slow release fertilizers may also be coated with the sulfonated polymers in accordance with the present invention, such as:

| | |
|---|---|
| Sulphur coated urea | Glycouril |
| Isobutylidene diurea | Magnesium ammonium |
| Crotonylidene diurea | phosphate (Mag Amp) |
| Urea formaldehyde | Guanyl urea sulphate |
| Trimethylene tetraurea | (GUS) |
| Oxamide | Guanyl urea phosphate |
| Cyanuric acid | (GUP) |
| Ammeline | Thiourea |
| Ammedlide | Phenylurea | or nitrogen fertilizers with the, following inhibitors of urease or nitrification activity, such as:
 N-Serve(2-chloro-6-(trichloromethyl)pyridine)—Dow Chemical
 Potassium azide—PPG Industries
 AM(2-chloro-4-chloro-6-methyl-pyrimidine)—Mitsui Toatsu Chemicals
 Thiourea
 DCD (Dicyandiamide)
 ST (sulfathiazole)
 Guanylthiourea
 PPD (phenylphosphorodiamidate)—Parrish Chemical Co.
 CD (carbondisulphide)

The present invention is particularly suitable for combinations of the aforementioned fertilizers with any pesticide including the examples listed below, although the present invention can be practiced with fertilizers and/or pesticides alone.

| | | |
|---|---|---|
| Atrazine | AATREX | Green Cross Products |
| Triallate | AVADEX BW | Monsanto Chemical Co. |
| Trifluralin | TREFLAN | Eli Lilly Inc. (Elanco) |
| Glysophate | ROUNDUP | Monsanto Chemical Co. |
| Glysophate + 2,4-D | RUSTLER | Monsanto Chemical Co. |
| Sethoxydim | POAST | BASF |
| Metolachlor | DUAL | Green Cross Products |
| EPTC | EPTAM | Chipman Inc. |

| -continued | | |
|---|---|---|
| EPTC + R25788 | ERADICANE 8-E | Chipman Inc. |
| Metolachlor + atrazine | PRIMEXTRA | Green Cross Poducts |
| Metribuzin | SENCOR | Chemagro Ltd. |

INSECTICIDES such as:

These are current granular insecticides:

| Terbufos | COUNTER 5-G | Cyanamid Ltd. |
|---|---|---|
| Fonofos | DYFONATE | Chipman Inc. |
| Carbofuran | FURADAN | Chemagro Ltd. |
| Aldicarb | TEMIK | Union Carbide |

It should be understood, however, that the inclusion of herbicides with fertilizers coated with sulfonated polymers is not inconsistent with the term vegetation enhancement agent which is intended to be applied to the desired or target plant. The fact that herbicide may kill undesired vegetation does not diminish its role as a vegetation enhancement agent for others, particularly the vegetation for which the fertilizer is intended.

As previously indicated, the previously listed fertilizers and pesticides, either individually and/or in mixtures, may be coated with sulfonated polymers in accordance with the present invention. In this regard, the substrate of the vegetation enhancement agent for purposes of the present invention may be a member selected from the group consisting of macronutrients, micronutrients, nitrogen fertilizers including inhibitors of urease, nitrogen fertilizers including inhibitors of nitrification activity, slow release fertilizers, and pesticides, in addition to mixtures of a plurality of each of the macronutrients, micronutrients, nitrogen fertilizers including inhibitors of urease, nitrogen fertilizers including inhibitors of nitrification activity, slow release fertilizers and pesticides, as well as mixtures of members from each group of macronutrients, micronutrients, nitrogen fertilizers including inhibitors of urease, nitrogen fertilizers including inhibitors of nitrification activity, slow release fertilizers and pesticides. In addition, the fertilizers and fertilizer/pesticide combinations coated with sulfonated polymer in accordance with the present invention may be mixed with non-coated fertilizers and/or pesticides of the same or different composition. In this regard, the non-coated member may be selected from the group consisting of macronutrients, micronutrients, nitrogen fertilizers including inhibitors of urease, nitrogen fertilizers including inhibitors of nitrification activity, slow release fertilizers and pesticides in addition to mixtures of a plurality of each of the groups of vegetable enhancement agents as well as mixtures of one or more members of each of the previously mentioned groups. When this is the case, the fertilizer or fertilizer/pesticide combination coated with the sulfonated polymer in accordance with the present invention may comprise 5 to 95% by total weight of the mixture or the non-coated vegetation enhancement agent may comprise 5 to 95% by total weight of the mixture.

The plant growth media to which the fertilizers and fertilizer-pesticide composites coated in accordance with the present invention may be applied include liquid cultures i.e., hydroponics, soil-less cultures and any mixture of sand, vermiculite, peat, perlite, or any other inert or relatively inert support, and soils which can be either irrigated or rainfed soils.

The seeds or plants envisioned to be fertilized by the instant invention includes among others:

CEREALS, such as:

| Common Name | Botanical Name |
|---|---|
| Barley | Hordeum vulgare |
| Buckwheat | Fagopyrun esculentum |
| Canarygrass | Phalaris canariensis |
| Maize | Zea mays |
| Millet | Pennisteum |
| Oats | Avena sativa |
| Rice | Oryza sativa |
| Rye | Secale cereale |
| Sundangrass | Sorghum sudanense |
| Sorghum | Sorghum vulgare |
| Sesame | Seasamum orientale |
| Triticale | Triticale SPP |
| Wheat | Triticum aestivum |

GRASSES (including turf), such as:

| Common Name | | Botanical Name |
|---|---|---|
| Bahiagrass | | Paspalum notatum |
| Beachgrass: | American | Ammophilia breviligulata |
| | European | Ammophilia arenaria |
| Bentgrass: | Colonial | Agrostis tenuis |
| | Creeping | Agrostis palustris |
| | Velvet | Agrostis canina |
| Bermudagrass | | Cynodon dactylon |
| Bluegrass: | Annual | Poa annua |
| | Canada | Poa compressa |
| | Kentucky | Poa pratensis |
| Bluegrass: | Rough | Poa trivialis |
| | Upland | Poa glaucantha |
| Bromegrass-smooth | | Bromus inermis |
| Bromesedge | | Andropogon virginicus |
| Buffalograss | | Buchloe dactyloides |
| Canarygrass, | reed | Phalaris arundinacea |
| Carpetgrass | | Axononpus affinis |
| Centipedegrass | | Eremochloa ophiuroides |
| Crabgrass: | Large | Digitaria sanguinalis |
| | Smooth | Digitaria ischaemum |
| Dallisgrass | | Paspalum dilatatum |
| Fescue: | Chewings | Festuca rubra |
| | Hard | Festuca ovina |
| | Meadow | Festuca elatior |
| | Red | Festuca rubrum |
| | Sheep | Festuca ovina |
| | Tall | Festuca arundinaceae |
| Goosegrass | | Eleucine indica |
| Grama: | Blue | Bouteloua gracilis |
| | Sideoats | Bouteloua curtipendula |
| Japanese lawngrass | | Zoysia japonica |
| Kikuyugrass | | Pennisetum clandestinum |
| Lovegrass, | weeping | Eragrostis curvula |
| Manilagrass | | Zoysia matrella |
| Orchardgrass | | Dactylis glomerata |
| Paspalum, | field | Paspalum laeve |
| Quackgrass | | Agropyron repens |
| Redtop | | Agrostis alba |
| Ryegrass: | Annual | Lolium multiflorum |
| | Perennial | Lolium perenne |
| Ste. Augustinegrass | | Stenotaphrum secundatum |
| Timothy | | Phleum pratense |
| Velvetgrass | | Holcus janatus |
| Wheatgrass: | Crested | Agropyron desertorum |
| | Fairway | Agropyron cristatum |
| | Streambank | Agropyron riparium |
| Zoysiagrass | | Zoysia spp. |

LEGUMES, such as:

| Common Name | Botanical Name |
|---|---|
| Alfalfa (lucerne) | Medicago sativa |

-continued

| Common Name | Botanical Name |
|---|---|
| Bean | *Phaseolus vulgaris* |
| Chickpea | *Cicer aeritinum* |
| Clover | *Trifolium spp. (T. pratense, T. repens, T. subterraneum)* |
| Cowpea | *Vigna sinensis* |
| Fababean | *Vicia faba* |
| Groundnut | *Arachis hypogaea* |
| Lentil | *Lens culinaris* |
| Lupin | *Lupinus* |
| Mungbean | *Vigna unguicultata* |
| Pea | *Pisum sativum* |
| Soybean | *Glycine max* |
| Winged bean | *Phaseolus aureus* |

OILSEEDS, such as:

| Common Name | Botanical Name |
|---|---|
| Canola | *Brassica napus* |
| Coconut | |
| Cotton | |
| Mustard | *Brassica juncea* |
| Flax | *Linum usitissatum* |
| Linseed | |
| Olive oil | |
| Palm | |
| Rapeseed | *Brassica campestris* |
| Safflower | |
| Sesame seed | |
| Sunflower | *Helianthus annus* |

ROOTS AND TUBERS, such as:

| Common Name | Botanical Name |
|---|---|
| Cassava | *Manihot esculenta* |
| Potato | *Solanum tuberosum* |
| Sweet potato | *Ipomoea batatis* |
| Taro | *Colocasia esculenta* |
| Yam | *Discorea rotundata* |

SUGAR CANE, such as:

| Common Name | Botanical Name |
|---|---|
| Sugar beet | |
| Sugarcane | *Saccharum spp.* |
| Maple tree | |

VEGETABLES such as:

| Common Name | Botanical Name |
|---|---|
| Bean | *Phaseolus vulgaris* |
| Beet | *Beta vulgaris* |
| Broccoli | *Brassica oleracea* var *italica* |
| Brussel sprouts | *Brassica oleracea* var *gemmifera* |
| Cabbage | *Brassica oleracea* var *capitata* |
| Cantaloupe | *Cucumis melo* |
| Carrot | *Daucus carota* var. *sativus* |
| Cauliflower | *Brassica oleracea* var *acephala* |
| Celery | *Apium graveolens* |
| Chard | *Beta vulgaris* |
| Chicory | *Cichorium intybus* |
| Chinese cabbage | *Brassica rapa* |
| Collard | *Brassica oleracea* var *acephala* |
| Cucumber | *Cucumis satvus* |
| Dill | *Anethum graveolens* |
| Egg Plant | *Solanum melongena* |
| Endive | *Cichorium endiva* |
| Fennel | *Foeniculum vulgar* |
| Kale | *Brassica oleracea* |
| Kohl Rabi | *Brassica oleracea* |
| Leek | *Allium ampeoloprasum* |
| Lima Bean | *Phaseolus limensis (P. lunatus)* |
| Mustard | *Brassica juncea* |
| Okra | *Abelmuschus esculentus* |
| Onion | *Allium cepa* |
| Parsley | *Petroselinum crispun (P. hortense)* |
| Parsnip | *Pastinaca sativa* |
| Pea | *Pisum sativum* |
| Pepper | *Capsicum annum* |
| Pumpkin | *Cucurbita spp.* |
| Radish | *Raphanus sativus* |
| Rutabaga | *Brassia napus* |
| Salsify | *Tragopogon porrifolious* |
| Spinach | *Spinacia oleracea* |
| Squash | *Cucurbita spp.* |
| Sweet Corn | *Zea mays* var *rugos* (var. *saccharata*) |
| Swiss chard | *Beta vulgaris* |
| Tomato | *Lycopersicon lycopersicum* |
| Turnip | *Brassica rapa* |
| Watermelon | *Citrullus lanatus* |

| Common Name | Botanical Name |
|---|---|
| Bean | *Phaseolus vulgaris* |
| Beet | *Beta vulgaris* |
| Broccoli | *Brassica oleracea* var *italica* |
| Brussel sprouts | *Brassica oleracea* var *gemmifera* |
| Cabbage | *Brassica oleracea* var *capitata* |
| Cantaloupe | *Cucumis melo* |
| Carrot | *Daucus carota* var. *sativus* |
| Cauliflower | *Brassica oleracea* var *acephala* |
| Celery | *Apium graveolens* |
| Chard | *Beta vulgaris* |
| Chicory | *Cichorium intybus* |
| Chinese cabbage | *Brassica rapa* |
| Collard | *Brassica oleracea* var *acephala* |
| Cucumber | *Cucumis satvus* |
| Dill | *Anethum graveolens* |
| Egg Plant | *Solanum melongena* |
| Endive | *Cichorium endiva* |
| Fennel | *Foeniculum vulgar* |
| Kale | *Brassica oleracea* |
| Kohl Rabi | *Brassica oleracea* |
| Leek | *Allium ampeoloprasum* |
| Lima Bean | *Phaseolus limensis (P. lunatus)* |
| Mustard | *Brassica juncea* |
| Okra | *Abelmuschus esculentus* |
| Onion | *Allium cepa* |
| Parsley | *Petroselinum crispun (P. hortense)* |
| Parsnip | *Pastinaca sativa* |
| Pea | *Pisum sativum* |
| Pepper | *Capsicum annum* |
| Pumpkin | *Cucurbita spp.* |
| Radish | *Raphanus sativus* |
| Rutabaga | *Brassia napus* |
| Salsify | *Tragopogon porrifolious* |
| Spinach | *Spinacia oleracea* |
| Squash | *Cucurbita spp.* |
| Sweet Corn | *Zea mays* var *rugos* (var. *saccharata*) |
| Swiss chard | *Beta vulgaris* |
| Tomato | *Lycopersicon lycopersicum* |
| Turnip | *Brassica rapa* |
| Watermelon | *Citrullus lanatus* |

TREES such as:

| Common Name | Botanical Name |
|---|---|
| Coniferous: | |
| White spruce | *Picea glauca* |
| Black spruce | *Picea.mariana* |
| Red spruce | *Picea rubens* |
| Red pine | *Pinus resinosa* |
| Jack pine | *Pinus banksiana* |

-continued

| Common Name | Botanical Name |
|---|---|
| Lodgepole pine | Pinus contorta |
| Ponderosa pine | Pinus ponderosa |
| Eastern white pine | Pinus strobus |
| Western white pine | Pinus monticola |
| Balsam fir | Abies balsamea |
| Douglas fir | Pseudotsuga taxifolia |
| Rocky Mountain juniper | Juniperus scopulorum |
| Tamarack | Larix laricina |
| Hemlocks | Tsuga spp. |
| Deciduous: | |
| Maple | Acer spp. |
| Alder | Alnus spp. |
| Birch | Betula spp. |
| Hickory | Carya spp. |
| Chestnut | Castanea dentata |
| Dogwood | Cornus spp. |
| Ash | Fraxinus spp. |
| Crabapple | Malus spp. |
| Sycamore | Plantanus occidentalis |
| Cottonwood | Populus Spp. |
| Cherry | Prunus spp. |
| Oak | Quercus Spp. |
| Willow | Salix spp. |
| Elm | Ulmus Spp. |

ORNAMENTALS such as:

| Common Name | Botanical Name |
|---|---|
| Carnation | Dianthus caryophyllus |
| Chyrsanthenum | Crysanthemum morifolium |
| Orchid | Cattleya spp., Cymbidiums spp. |
| Rose | Rosa manetti |
| Snapdragon | Antirrhinium majus |
| Bulbs: | Begonias |
| | Crocus |
| | Snowdrop |
| | Hyacinth |
| | Lilly |
| | Daffodil |
| | Tulip |
| | Iris |
| | Gladiolus |

FRUITS, such as:

| Common Name | Common Name | Common Name |
|---|---|---|
| Apple | Grape | Peach |
| Avocado | Grapefruit | Pineapple |
| Banana | Kiwi | Plantain |
| Blackberry | Lemon | Raspberry |
| Citrus | Lime Mango | Starfruit |
| Currant | Orange | Strawberry |
| Date | Papaya | Tangarine |

NUTS such as:

| Common Name | Common Name |
|---|---|
| Almonds | Hazelnuts (Filberts) |
| Cashew nuts | Pistachios |
| Chestnuts | Walnuts |
| Groundnuts | |

INDUSTRIAL CROPS such as:

| Common Name | Common Name | Common Name |
|---|---|---|
| Cocoa | Hops | Sesame |
| Coffee | Jute | Tea |
| Cotton | Oil palm | Tobacco |
| Hemp | Rubber | |

The rate of release of the nutrients from the coated fertilizers of the present invention can be controlled by the thickness of the sulfonated polymer coating, the degree of sulfonation of the polymer, the degree of neutralization of the sulfonate groups in the sulfonated polymers, the type of cation in the sulfonated polymers, the biodegradability of the sulfonated polymer, and the integrity and conformity of application of the polymer.

The following examples demonstrate the performance of sulfonated polymer as a barrier coating when applied to organic and inorganic fertilizers.

EXAMPLE 1

Preparation of Sulfonated EPDM

A sulfonated EPDM terpolymer (TP-320) is prepared by sulfonating a 40 Mooney viscosity at 100° C. EPDM terpolymer (Royalene 521-Uniroyal) which has about 50 weight percent ethylene, about 5 weight percent ENB, with acetyl sulfate and neutralizing with Zn $(Ac)_2$ according to the procedure of U.S. Pat. No. 3,836,511, herein incorporated by reference, thereby producing 10 meq. of zinc sulfonate groups per 100 grams of the EPDM terpolymer and 25 meq. of zinc sulfonated groups per 100 grams of the EPDM terpolymer.

EXAMPLE 2

Improved Barrier Properties of a Sulfonated Polymer

A solution of the sulfonated EPDM polymer similar to the polymer of Example 1 was prepared for application as a coating solution.

The solution was cast as a coating over samples in order to measure the barrier properties for urea extraction by water through the thin film coating.

Preparation of Solution

The solution of the sulfonated EPDM was prepared by mixing with a magnetic stirrer. The solution consisted of 2.5 grams of zinc sulfo-EPDM similar to the polymer described in Example 1 (Uniroyal Ienic Elastomer 2560 or ZSE 25), containing 25 meq. of sulfonate groups per 100 grams of ethylene propylene ethylidenenorborne terpolymer neutralized with zinc, in 100 grams of a solvent consisting of 97.5% toluene and 2.5% methanol reagent.

Coating Procedure

To determine the barrier properties of film formed from the solution of the sulfonated EPDM terpolymer, urea slides were coated for immersion tests. The coating procedure and the procedures for conducting immersion tests were as follows:

Urea samples were prepared by depositing reagent grade urea (Fisher Scientific) over microscope glass slides. This was done by dipping glass slides into molten urea at a temperature of about 135°-145° C., followed by cooling and solidification of the urea layer. The urea layer was built up to about 7 mm by 4 to 5 successive dipping and cooling cycles. These urea samples were then coated by a polymeric film using a second dipping procedure. Urea slides were repeatedly dipped into polymeric solutions, such as those listed below in Table 1, followed by drying in a vacuum oven at 70° C. for about 3 hours. The dipping and drying cycles were repeated until the film thickness shown in Table 1 were obtained.

The barrier properties of the various polymeric films were determined by immersion of each coated urea slide in about 100 g. of deionized water at room temperature. The amount of urea released into the water was determined by recovering the urea after evaporating the water. Each sample was initially immersed for 1 day, followed by immersion in fresh water for 3 days and for weekly intervals thereafter.

Table 1 shows the permeabilities of urea solution extracted from the coated urea slides and immersed in water at room temperature. The permeabilities of the coating materials were determined by applying Fick's law of diffusion at steady state.

Fick's law states that:

$$J_m = DA \frac{C}{\sigma}$$

where $J_m$=mass flux (loss) through the film or membrane, A=transport area, C=concentration gradient, d=film or membrane thickness, and D=membrane diffusivity constant which is equal to the ratio of permeability (P) over the solubility ratio (K) or urea in the membrane and in water.

The performance of the zinc-sulfo-EPDM film was compared with films that were formed from solutions of other commercial coating materials. The first commercial coating solution was a tung oil solution made by Formby of Mississippi at 30 weight percent solids in petroleum distillate. The second commercial coating solution was linseed oil modified polyurethane Type I made by Minwax Paint Co. of NJ at 45% solids in petroleum distillate. The two commercial coatings were cured at 70° C. for 48 hours after coating.

The permeability of urea solution through the zinc sulfonated EPDM terpolymer film was found to be about 3 orders of magnitude lower than either that of tung oil or that of polyurethane.

As shown in Table 1, this Example shows that thin films of zinc sulfonated EPDM terpolymer complex provide a much better barrier than do commercial materials.

TABLE 1

Permeability of urea solution from coated urea slides in water at room temperature.

| Sample No. | Coating Material | Ratio wt/wt | Film Thickness Microns | Permeability (P = DK) cm$^2$/sec |
|---|---|---|---|---|
| 141-3 | Tung Oil | — | 75 | 4.3 × 10$^{-9}$ |
| 141-6 | Tung Oil | — | 125 | 7.6 × 10$^{-9}$ |
| 158-4 | Polyurethane | — | 100 | 1.3 × 10$^{-9}$ |
| 158-5 | Polyurethane | — | 40 | 2.1 × 10$^{-9}$ |
| 28-14 | ZSE-25 | — | 10 | 9.6 × 10$^{-13}$ |
| 84-1 | ZSE-25 | — | 25 | 8.6 × 10$^{-13}$ |
| 84-2 | ZSE-25 | — | 30 | 8.6 × 10$^{-13}$ |

EXAMPLE 3

Solutions of sulfonated EPDM polymer similar to the polymer described in of Example 1 with a sulfonation level of 10 meq. per 100 grams (ZSE 10) were prepared as a coating solution as set forth in Example 2. Except for the coatings of reagent sulfur and paraffin wax, discussed below, the samples were coated in accordance with the procedure set forth in Example 2.

For purposes of this Example, thick coatings of regent sulfur and paraffin wax (M.P.=55° C.) were applied through melting i.e., these materials were melted at about 5° C. to 10° C. above their melting point; after quickly dipping urea samples in the melt the hot coated samples were then brought to room temperature slowly. This layering procedure was repeated three to four times.

FIG. 1 shows that ZSE-10 offered that best protection in preventing the dissolution of urea in water at a room temperature of about 22° C. As indicated, uncoated urea dissolved quickly in water, but even thick coatings of sulfur, unsulfonated EPDM and PEVAC on similar samples did not sufficiently protect urea from dissolving in water. Paraffin wax and modified polyurethane type 1 (made by Minwax Paint Company) protected urea from dissolving in water for at least six days. ZSE-10, however, performed the best in protecting urea from water dissolution.

EXAMPLE 4

Protection from Overwinter Loss of Fertilizer Urea

Sulfonate-coated urea granules and uncoated urea granules were banded into a black Chernozemic soil in October at a rate of 60 kg N/ha. The experimental site was the University of Alberta farm at Ellerslie, Alberta, Canada.

The sulfonate-coated urea granules were produced using the following procedure:

40 kg of granular urea produced by Esso Chemical Alberta Ltd. was introduced into a fluid bed coating machine, including a Wurster insert, manufactured by Glatt Air Techniques Inc., model number: GPCG-5. The urea bed was fluidized by blowing 130 scfm of heated air (60° C.) through the bed. After the bed reached a temperature of 50° C., a 1.25% (by weight) solution of the sulphonated polymer in toluene and isopropanol cosolvent was sprayed onto the urea granules at the Wurster insert entrance. The spray nozzle used was a commercial two-fluid nozzle using air (at 3 bars pressure) to form an atomized spray regime in the Wurster insert.

The spraying was continued at 40 gm/min rate until the required thickness of polymeric coating was built up on the urea granules, i.e., approximately 1½ hours per a coating level of 1% (wt) polymer on urea.

After the solution was sprayed onto the granules in the Wurster insert, the thus coating granules were blown by the heated air upwards into a drying section of the machine. Here, the solvents were evaporated by the hot stream, leaving a thin coat of dried polymeric material on the granules. The dried granules fell back into the fluid bed and then re-entered the Wurster insert where the coating processs was repeated. Thus, multiple films or layers of sulfonated polymeric coating was built up until the spraying was stopped.

This process was used for coating various sizes of urea, i.e., 2.0 mm to 6.0 mm average diameter and various thicknesses of coating ranging from 0.25 wt % to 3 wt % polymer on urea substrate.

Chemical analyses of urea, ammonia, nitrate, made in accordance with the procedures disclosed in Methods of Soil Analysis Part 2. Agronomy 9. 1982 American Society of Agronomy, based on sampling of the soil taken 6 months later of the urea bands to a depth of 60 cm revealed that for the coated urea, 22% remained in the urea form and 60% in soil urea or ammonium forms. In contrast uncoated urea nitrogen is normally readily lost as gas to the atmosphere, i.e., due to volataillization and denitrification, by leaching into the groundwater, or immobilization into microorganisms and the soil organic matter with most of these losses occurring when soil moisture levels are high, i.e. on the order of 22 kPa, and temperatures in excess of 5° C. As shown in Table 2, the coated forms were considered safe from loss, whereas the uncoated urea had been completely hydrolyzed to ammonium. Moreover, 19% of the uncoated urea was in a highly loss susceptible nitrate form, and eleven percent of the uncoated urea could not be accounted for and was presumably already lost.

TABLE 2

Percent recovery of fall-applied coated and uncoated urea fertilizer prior to spring planting.

| Soil N Form | Percent Recovery | |
|---|---|---|
| | Uncoated Urea | Sulfonate Coated Urea |
| Urea in granule | 0 | 22 |
| Urea N in soil | 0 | 4 |
| Ammonium N in soil | 69 | 56 |
| Nitrate N in soil | 19 | 17 |
| N loss (unaccounted) | 11 | 1 |

EXAMPLE 5

Sulfonate-Coated Urea to Replace Multiple Urea Applications for Irrigated Soft White Spring Wheat Under Intensive Cereal Management Intensive cereal management (ICM) is a concept of maximizing yields by a more integrated approach to crop management. This technique includes higher seeding and fertilizer rates, prophylactic use of herbicides and insecticides and the application of plant growth regulators (PGR's). Fertilizers are applied at key plant growth stages such as tillering, stem elongation, booting, etc. thereby replacing split fertilizer applications.

Sulfonate-coated urea granules produced in accordance with the procedure set forth in Example 4 and uncoated urea was broadcast and incorporated in the early Spring on Brown chernozem at Barnwell, Alberta, Canada. Factors studied included two wheat varities (Owens, Fielder), four seeding rates (300, 400, 500, 600 seeds/m$^2$), and one nitrogen rate (140 kg/ha) applied prior to seeding.

Top-dressing occurred at Zadok's growth stages 21 (tillering) or at 21 and 32 (stem elongation, first node) at a rate of 20 kg N/ha for each application. Treatments without top-dressing were also included.

Plant growth regulators (Cerone (97 g/ha) and Cyclocel C, (0.8 L/ha), Tilt fungicide and Mataven, Torch and MCPA herbicides were applied at recommended rates to all treatments.

The completely randomized design in four replicates permitted each individual and combinations of the above treatments to be evaluated.

Two different sulfonate-coated ureas were evaluated. C1 was ZSE-25 (as per Example 4) while C2 was a copolymer of ZSE-25 plus SVP. Coatings were 2.0 weight % relative to the fertilizer.

TABLE 3

Effect of fertilizer type on grain yields of soft white spring wheat at Barnwell.

| | Fertilizer Type Seed Yield (tonnes/ha) | | |
|---|---|---|---|
| Wheat Variety | Urea | C1 | C2 |
| Owens | 2.97 | 3.63 | 3.72 |
| Fielder | 2.61 | 3.04 | 2.86 |

As shown in Table 3, sulfonate-coated urea resulted in significantly higher seed yields for both wheat varieties when compared with uncoated normal urea.

TABLE 4

Effect of seeding rate and fertilizer type on the grain yields of soft white wheat cultivar Owens

| Seeding Rate | Fertilizer Type | | | |
|---|---|---|---|---|
| Seed Yield Seeds/m$^2$ | Urea | C1 | C2 | Mean |
| | | tonnes/ha | | |
| 300 | 2.70 | 3.27 | 2.86 | 2.94 |
| 400 (normal) | 3.05 | 3.73 | 3.81 | 3.53 |
| 500 | 2.96 | 3.43 | 3.93 | 3.44 |
| 600 | 3.16 | 4.10 | 4.22 | 3.83 |

As shown in Table 4, the sulfonate-coated urea (per Example 4) resulted in higher seed yields than uncoated urea at all seeding rates. The benefit of using the coated urea was maximal when all other inputs were high, i.e., at high seeding rates.

Both sulfonate-coated urea (C1 and C2) resulted in higher seed yields when applied in the single 140 kg N/ha dose at planting than uncoated urea with up to two top-dressings of 20 kg N/ha each of ammonium nitrate. The magnitude of the yield benefit obtained with coated urea was most obvious at the higher seeding rates, as shown in Table 5.

TABLE 5

Effect of seeding rate, fertilizer type and program on the total seed yields of Owens soft white.

| | | Fertilizer Program | | |
|---|---|---|---|---|
| Seeding Rate Seeds/m$^2$ | Fertilizer Type | GS 0 | GS 0 GS 21 GS 32 Seed Yield tonnes/ha | GS 0 GS 21 |
| 300 | Urea | 2.28 | 3.22 | 2.61 |
| | C1 | 3.37 | 3.30 | 3.31 |
| | C2 | 3.06 | 2.49 | 3.01 |
| 400 | Urea | 2.74 | 3.17 | 3.24 |
| | C1 | 3.70 | 3.57 | 3.93 |
| | C2 | 3.60 | 3.95 | 3.89 |
| 500 | Urea | 2.89 | 2.78 | 3.22 |
| | C1 | 3.53 | 3.40 | 3.37 |
| | C2 | 3.60 | 4.11 | 4.09 |
| 600 | Urea | 3.08 | 3.21 | 3.18 |
| | C1 | 4.19 | 3.83 | 4.27 |
| | C2 | 4.15 | 4.05 | 4.45 |

[1]140 kg N/ha
[2]20kg N/ha

EXAMPLE 6

Admixing Coated and Uncoated Urea with Wheat Seeds

Nitrogen rates in excess of 25 kg N/ha are toxic to many seeds when urea or ammonical fertilizer is placed in intimate contact with the seed.

Sulfonate-coated urea granules produced in accordance with Example 4, and uncoated urea granules were placed adjacent to Katkepwa hard red spring wheat in plant-growth vessels containing a mixture (1:1:1) of sphagnum peat moss, vermiculite and acid-washed quartz sand. The plant-growth medium was moistened and the vessels maintained in direct sunlight for up to 4 weeks to observe the effect of the fertilizer on wheat seed germination.

No single seed placed in contact with uncoated urea germinated thereby confirming the well-documented toxicity of urea to seeds. Eighty percent on the wheat seeds in contact with the sulfonate-coated (ZSE-25) urea germinated in a normal fashion within one to two weeks.

Thus sulfonate-coated urea permits intimate admixing of wheat seeds and fertilizer urea with anticipated yield enhancement.

EXAMPLE 7

Sulfonated-Coated Urea to Reduce Pollution of Groundwater by Fertilizer-Derived Nitrates Pollution of groundwater with nitrates derived from agricultural products such as fertilizers is rapidly becoming a critical issue in the United States and Europe. For example, the Tennessee Valley Authority in a survey of groundwater contamination has associated nitrate problems with high fertilization rates in at least five states: California, Indiana, Iowa, Minnesota, and Nebraska. United States Geological Survey data indicates that nitrate pollution of drinking water wells is a serious problem in a number of states, particularly those in the corn belt as well as Arizona, California, Texas, New York and Delaware.

The United States "Safe Drinking Water Act", several new or proposed state laws and enactments in Denmark, Holland, the United Kingdom (with other pending EEC legislation) are all addressing the issue of excess nitrates in groundwater by imposing taxes and financial penalties on fertilizer nitrogen usage. Denmark, for instance, has proposed to reduce fertilizer nitrogen use from 380,000 to 200,000 tonnes per annum by 1990.

However, if fertilizer nitrogen rates are reduced, so will crop yields by correspondingly reduced. A corollary is that per unit production costs of crop production will increase dramatically.

Controlled release urea minimizes leaching of nitrates into groundwater by maintaining fertilizer urea or ammonium forms for longer periods. Urea and ammonium are less subject to leaching losses because they are chemically bound to the clay minerals and organic matter in the soil.

An experiment was conducted with columns of soil to show the benefits of controlled release urea relative to uncoated fertilizer in reducing nitrates leached into groundwater. Sulphonate-coated (see Example 4) and uncoated urea was broadcast and incorporated into a Brown Chernozemic soil at rates varying from zer oto 200 kg N/ha. The soil was packed into columns 60 cm high and 10 cm wide and planted with the Katepwa variety of hard red spring wheat. The column dimensions ensured that the rooting pattern of the wheat was not restricted and approximated that found in a normal field situation. Water samples were taken daily form the bottom of the columns for six weeks and analyzed for nitrate nitrogen by routine procedures (Methods of Soil Analysis, Vol. 2, American Society of Agronomy 1982).

TABLE 6

Cumulative nitrate-nitrogen recovered in leachate over 6 week experimental period from soil columns fertilized with sulfonate-coated urea (CRU) or uncoated urea

| Mixture of | | Leachate Nitrate | % Leached Nitrate derived from | | |
|---|---|---|---|---|---|
| Urea | CRU | | Urea | CRU | Soil |
| kg N/ha | | | | | |
| 100 | 0 | 6.5 | 60.9 | 0.0 | 39.1 |
| 75 | 25 | 4.6 | 67.8 | 2.1 | 30.0 |
| 50 | 50 | 4.2 | 56.0 | 0.0 | 44.0 |
| 25 | 75 | 3.4 | 56.9 | 0.0 | 43.1 |
| 0 | 100 | 2.5 | 0.0 | 7.9 | 92.1 |
| 200 | 0 | 7.2 | 37.3 | 0.0 | 62.7 |
| 150 | 50 | 5.4 | 44.3 | 1.9 | 53.8 |
| 100 | 100 | 4.6 | 59.1 | 2.2 | 38.7 |
| 50 | 150 | 4.9 | 38.5 | 0.8 | 60.7 |
| 0 | 200 | 4.5 | 0.0 | 1.8 | 98.2 |

Groundwater nitrate derived from uncoated urea fertilizer varied from 37 to 76% of total nitrates regardless of the fertilizer nitrogen rate. Sulfonate-coated urea generally contributed less than 2% of the groundwater nitrate with a high of 8% at an application rate of 100 kg N/ha. An important source of nitrates found in groundwater came from the soil, i.e. from mineralization of organic nitrogen from microbial catabolism of soil organic matter.

This data clearly indicates the benefits of using sulfonate coated urea to minimize fertilizer-derived nitrates in groundwater. Uncoated urea contributed substantial amounts of nitrate to groundwater whereas sulfonate coated urea contributes less than 2% of the total nitrate content of groundwater, well within acceptable environmental standards of 10 mg nitrate-nitrogen per liter established by the U.S. Environmental Protection Agency.

It is further understood that although the invention has been specifically described with reference to particular means and embodiments, the foregoing description is that of preferred embodiments of the invention. The invention is not limited to the particulars disclosed, but extends to all equivalents, and various changes and modifications may be made in the invention without departing from the spirit and scope thereof.

What is claimed is:

1. A vegetation enhancement composite comprising:
   (a) a vegetation enhancement agent in a substantially solid form consisting of a first member selected from the group consisting of at least one nitrogen fertilizer including a member selected from the group consisting of an inhibitor of urease and an inhibitor of nitrification activity, a slow release fertilizer, and mixtures of a pesticide and a member selected from the group consisting of at least one macronutrient, micronutrient, nitrogen fertilizer including a member selected from the group consisting of an inhibitor of urease and an inhibitor of nitrification activity, and slow release fertilizer; and
   (b) at least one first controlled release film comprising a sulfonated polymer extending over at least a portion of a surface of said vegetation enhancement agent wherein said first controlled release film comprises an interpolymeric complex of a neutralized sulfonated polymer and an amine containing polymer, said amine containing polymer containing basic nitrogen atoms wherein said basic nitrogen content ranges from about 4 to about 500 meq. per 100 grams of said amine containing polymer.

2. The vegetation enhancement composite of claim 1, wherein said substantially solid form has a dimension within the range of about 1 to about 10 mm.

3. The vegetation enhancement composite of claim 2, wherein said dimension is about 1.5 to 3.0 mm.

4. The vegetation enhancement composite of claim 3, wherein said substantially solid form comprises particles and said dimension is a major dimension of said particles.

5. The vegetation enhancement composite of claim 4, wherein said particles are granules and said dimension is the diameter of said granules.

6. The vegetation enhancement composite of claim 5, wherein said diameter of said granules is within the range of about 1 to about 6 nun.

7. The vegetation enhancement composite of claim 6, wherein said diameter of said granules is about 1.0 to about 3.5 mm.

8. The vegetation enhancement composite of claim 1, said composite further comprising:
c) at least one second controlled release film superposed with respect to said at least one first controlled release film.

9. The vegetation enhancement composite of claim 8, wherein said first controlled release film is in direct contact with said vegetation enhancement agent.

10. The vegetation enhancement composite of claim 8, wherein said first controlled release film forms an exterior surface of said composite.

11. The vegetation enhancement composite of claim 1, comprising a mixture with at least one second member selected from the group consisting of at least one macronutrient, nitrogen fertilizer including a member selected from the group consisting of an inhibitor of urease, and an inhibitor of nitrification activity, and slow release fertilizer, and mixtures of at least one macronutrient, micronutrient, nitrogen fertilizer including a member selected from the group consisting of an inhibitor of urease, and an inhibitor of nitrification activity, and slow release fertilizer and a pesticide.

12. The vegetation enhancement composite of claim 11, wherein said second member comprises about 5 to 95% by total weight of said mixture.

13. The vegetation enhancement composite of claim 11, wherein said first member comprises 5 to 95% by total weight of said mixture.

14. The vegetation enhancement composite of claim 1, wherein said first controlled release film is a coating which essentially completely encapsulates said vegetation enhancement agent.

15. The vegetation enhancement composite of claim 14, wherein said coating is substantially free of orifices so as to physically insulate said vegetation enhancement agent from direct exposure to ambient conditions.

16. The vegetation enhancement composite of claim 15, wherein said coating has a thickness of less than about 50 microns.

17. The vegetation enhancement composite of claim 15, wherein said coating has a thickness of about 50 to about 200 microns.

18. The vegetation enhancement composite of claim 17, wherein said coating has a thickness of about 100 to about 200 microns.

19. The vegetation enhancement composite of claim 16, wherein said coating has a thickness of about 0.5 to about 20 microns.

20. The vegetation enhancement composite of claim 1, wherein said first controlled release film has a thickness of about 0.5 to about 20 microns.

21. The vegetation enhancement composite of claim 1, wherein said first controlled release film comprises about 0.1% to about 20% by total weight of said vegetation enhancement agent.

22. The vegetation enhancement composite of claim 1, wherein said sulfonated polymer has a sulfonate content of about 4 to about 200 microns per 100 grams of said sulfonated polymer.

23. The vegetation enhancement composite of claim 22, wherein said sulfonate content is about 10 to about 100 meq. per 100 grams of said sulfonated polymer.

24. The vegetation enhancement composite of claim 1, wherein said sulfonated polymer has a number average molecular weight within the range of 1,000 to 10,000,000.

25. The vegetation enhancement composite of claim 24, wherein said sulfonated polymers have a number average molecular weight within the range of 5,000 to 1,000,000.

26. The vegetation enhancement composite of claim 25, wherein said sulfonated polymers have a number average molecular weight within the range of 10,000 to 100,000.

27. The vegetation enhancement composite of claim 1, wherein said sulfonated polymers are neutralized sulfonated polymers and said sulfonate groups are neutralized with a member selected from the group consisting of an ammonium counterion and a metal counterion.

28. The vegetation enhancement composite of claim 27, wherein said metal counterion is a member selected from the group of transition elements and Groups IA and IIA of the Periodic Table of Elements.

29. The vegetation enhancement composite of claim 27, wherein said neutralized sulfonated polymer is formed from an elastomeric polymer.

30. The vegetation enhancement composite of claim 27, wherein said sulfonate groups are at least 50 mole percent neutralized.

31. The vegetation enhancement composite of claim 30, wherein greater than 90 mole percent of said sulfonate groups are neutralized.

32. The vegetation enhancement composite of claim 1, wherein said sulfonated polymer is selected from the group consisting of sulfonated polystyrene, sulfonated poly-t-butyl-styrene, sulfonated ethylene - propylene terpolymer, sulfonated styrene - methyl methacrylate copolymer, sulfonated polyisobutylene and sulfonated polyvinyl toluene.

33. The vegetation enhancement composite of claim 1, wherein said sulfonated polymer is selected from the group including EPDM terpolymer and Butyl rubber.

34. The vegetation enhancement composite of claim 1, wherein said amine-containing polymer is selected from the group containing primary, secondary and tertiary amine units.

35. The vegetation enhancement composite of claim 34, wherein said amine-containing polymer is a copolymer of styrene/vinyl-pyridine.

36. The vegetation enhancement composite of claim 35, wherein the copolymer is styrene-4-vinylpyridine having about 0.5 to 50 mole percent 4-vinylpyridine units.

37. The vegetation enhancement composite of claim 1, wherein said macronutrients are selected from the group consisting of nitrogen, potassium, phosphorous, sulfur, calcium and magnesium.

38. The vegetation enhancement composite of claim 37, wherein said first member is an inorganic fertilizer.

39. The vegetation enhancement composite of claim 37, wherein said slow release fertilizer is a member selected from the group consisting of Sulphur coated urea, Isobutylidene diurea, Crotonylidene diurea, Urea formaldehyde, Trimethylene tetraurea, Oxamide, Cyanuric acid, Ammeline, Ammedlide, Glycouril, Magnesium ammonium phosphate (Mag Amp), Guanyl urea sulphate (GUS), Guanyl urea phosphate (GUP), Thiourea, and Phenylurea.

40. The vegetation enhancement composite of claim 37, wherein said inhibitor of urease and inhibitor of nitrification activity is a member selected from the group consisting of N-Serve (2-chloro-6-(trichloromethyl) pyridine), Potassium azide, AM (2-chloro-4-chloro-6-methylpyrimidine), Thiourea, DCD (Dicyandiamide), ST (sulfathiazole), Guanylthiourea, PPD (phenylphosphorodiamidate), and CD (carbondisulphide).

41. The vegetation enhancement composite of claim 37, wherein said macronutrient is provided by members selected from the group consisting of ammonium sulphate, ammonium chloride, ammonium nitrate, ammonium phosphate nitrate, ammonium phosphate sulphate, sodium nitrate, potassium nitrate, calcium nitrate, ammonium nitrate-calcium carbonate mixture, diammonium phosphate, monoammonium phosphate, muriate of potash, sulphate of potash, single superphosphate, triple superphosphate, and potassium metaphosphate.

42. The vegetation enhancement agent of claim 41, wherein said source of macronutrient is ammonium sulfate.

43. The vegetation enhancement composite of claim 37, wherein said pesticide is a member selected from the group consisting of herbicides, insecticides, bacteriocides, fungicides, nematicides and sporicides.

44. The vegetation enhancement composite of claim 43, wherein said pesticides is selected from the group consisting of herbicides and insecticides.

45. The vegetation enhancement composite of claim 44, wherein said herbicides are selected from the group consisting of atrazine, triallate, trifluralin, glysophate, glysophote+2, 4-D, sethoxydim, metolachlor, EPTC, EPTC+R25788, and metribuzin.

46. The vegetation enhancement composite of claim 44, wherein said insecticides are selected from the group consisting of terbufos, fonofos, carbonfuran, and adidarb.

47. The vegetation enhancement composite of claim 37, wherein said source of macronutrient is urea.

48. A method of producing controlled release fertilizers comprising:
(a) providing a vegetation enhancement agent consisting of a first member selected from the group consisting of at least one nitrogen fertilizer including a member selected from the group consisting of an inhibitor of urease and an inhibitor of nitrification activity, and a slow release fertilizer, and mixtures of a pesticide and a member selected from the group consisting of at least one macronutrient, micronutrient, nitrogen fertilizer including a member selected from the group consisting of an inhibitor of urease and an inhibitor of nitrification activity, and slow release fertilizer; and (b) coating at least one surface of said vegetation enhancement agent with a sulfonated polymer dissolved in a solvent system including an organic liquid to form a controlled release coating on said vegetation enhancement agent wherein said first controlled release film comprises an interpolymeric complex of a neutralized sulfonated polymer and an amine containing polymer, said amine containing polymer containing basic nitrogen atoms wherein said basic nitrogen content ranges from about 4 to about 500 meq. per 100 grams of said amine containing polymer.

49. The method according to claim 48, wherein said solvent system comprises a cosolvent.

50. The method according to claim 49, wherein said cosolvent is a polar cosolvent.

51. The method according to claim 50, wherein said cosolvent comprises from 0.1 to 5.0 weight percent by total weight of sulfonated polymer, organic liquid, and cosolvent.

52. The method according to claim 51, wherein said cosolvent is isopropanol.

53. The method according to claim 52, wherein said organic liquid is toluene.

54. The method according to claim 49, wherein said cosolvent is a member selected from the group consisting of alcohols, amines, di-functional alcohols, tri-functional alcohols, amides, acetamides, phosphates, lactones, and mixtures thereof.

55. The method according to claim 49, wherein said cosolvent is a member selected from the group consisting of methanol, ethanol, n-propanol, isopropanol, 1.2 - propane diol, monoethyl ether of ethylene glycol and n-ethylformamide.

56. The method according to claim 49, wherein said cosolvent has a solubility parameter of at least 10.0.

57. The method according to claim 56, wherein said cosolvent has a solubility parameter of at least 11.0.

58. The method according to claim 48, wherein said coating is prepared by dissolving an amount of a member selected from the group consisting of a sulfonated polymer and interpolymeric complexes in a solvent system comprises an organic liquid to form a solution with a concentration of 0.1 to 20 weight percent.

59. The method according to claim 58, wherein said polymer is sulfonated polystyrene and said organic liquid is a member selected from the group consisting of benzene, toluene, ethyl benzene, methylethyl ketone, xylene, styrene, ethylendichloride, and methylene chloride.

60. The method according to claim 58, wherein said polymer is sulfonated poly-t-butyl-styrene and said organic liquid is a member selected from the group consisting of benzene, toluene, xylene, ethyl, benzene, styrene, t-butyl styrene, aliphatic oils, aromatic oils, hexane, heptane, decane, nonane.

61. The method according to claim 58, wherein said polymer is sulfonated ethylene-propylene terpolymer and said organic liquid is a member selected from the group consisting of pentane, aliphatic and aromatic solvent oils, benzene, diesel oil, toluene, xylene, ethyl benzene, pentane, hexane, heptane, octane, isooctane, nonane, decane, aromatic solvents, and ketone solvents.

62. The method according to claim 58, wherein said polymer is sulfonated styrene-methyl methacrylate copolymer and said organic liquid is a member selected from the group consisting of dioxane, and halogenated aliphatics.

63. The method according to claim 62, wherein said halogenated aliphatics are selected from the group consisting of methylene chloride and tetrahydrofuran.

64. The method according to claim 58, wherein said polymer is sulfonated polyisobutylene copolymers and said organic liquid is a member selected from the group consisting of saturated aliphatic hydrocarbons, diisobutylene, triisobutylene, aromatic and alkyl substituted aromatic hydrocarbons, chlorinated hydrocarbons, n-butyl ether, n-amyl ether, methyl oleate, aliphatic oils, and paraffinic oils.

65. The method according to claim 58, wherein said polymer is sulfonated polyvinyl toluene and said organic liquid is a member selected from the group consisting of toluene, benzene, xylene, cyclohexane, ethyl benzene, styrene, methylene chloride, ethylene dichloride.

66. An agricultural process comprising:
providing at least one layer of barrier material comprising a first film controlled release of sulfonated polymer between a vegetation enhancement agent and wherein said first controlled release film comprises an interpolymeric complex of a neutralized sulfonated polymer and an amine containing polymer, said amine containing polymer containing basic nitrogen atoms wherein said basic nitrogen content ranges from about 4 to about 500 meq. per 1 00 grams of said amine containing polymer, said vegetation enhancement agent consisting of a first member selected from the group consisting of at least one nitrogen fertilizer including a member selected from the group consisting of an inhibitor of urease and an inhibitor of nitrification activity, and a slow release fertilizer, and mixtures of a pesticide and a member selected from the group consisting of at least one macronutrient, micronutrient, nitrogen fertilizer including a member selected from the group consisting of an inhibitor of urease and an inhibitor of nitrification activity, and a slow release fertilizer, and vegetable matter to control exposure of said vegetable matter to said vegetation enhancement agent.

67. The process according to claim 66, wherein said vegetation enhancement agent comprises a first member selected from the group consisting of at least one macronutrient, nitrogen fertilizer including a member selected from the group consisting of an inhibitor of urease and an inhibitor of nitrification activity, and slow release fertilizer and mixtures of a pesticide a member selected from the group consisting of and at least one macronutrient, micronutrient, nitrogen fertilizer including a member selected from the group consisting of an inhibitor of urease, and an inhibitor of nitrification activity, slow release fertilizer.

68. The process according to claim 67, wherein said vegetation enhancement agent is in a substantially solid form.

69. The process according to claim 68, wherein said substantially solid form has a dimension within the range of about 1.0 to about 10.0 mm.

70. The process according to claim 68, said composite further comprises a second film superposed with respect to said first film.

71. The process according to claim 70, wherein said first film is in direct contact with said vegetation enhancement agent.

72. The process according to claim 70, wherein said first film forms an exterior surface of said vegetation enhancement agent.

73. The process according to claim 68, wherein said vegetation enhancement agent comprises a mixture with at least one second member selected from the group consisting of at least one macronutrient, micronutrient, nitrogen fertilizer including a member selected from the group consisting of an inhibitor of urease and an inhibitor of nitrification activity, slow release fertilizer, and mixtures of a pesticide and a member selected from the group consisting of at least one macronutrient, micronutrient, nitrogen fertilizer including a member selected from the group consisting of an inhibitor of urease, and an inhibitor of nitrification activity, slow release fertilizer and a pesticide.

74. The method according to claim 73, wherein said second member comprises about 5 to 95% by total weight of said mixture.

75. The process according to claim 67, wherein said vegetation enhancement agent is in the form of particles and said providing involves encapsulating said particles with said sulfonated polymer so as to physically insulate said vegetation enhancement agent from ambient conditions as an encapsulated vegetation enhancing agent.

76. The process according to claim 75, wherein said vegetable matter is a member selected from the group consisting of seeds, and plants.

77. The process according to claim 76, comprising exposing said encapsulated vegetation enhancement agent to said vegetable matter.

78. The process according to claim 76, wherein said vegetable matter is seeds.

79. The process according to claim 78, comprising blending said encapsulated vegetation enhancement agent with said seeds to form a mixture comprising said vegetation encapsulation agent and said seeds.

80. The process according to claim 78 wherein said seeds are selected from the group consisting of cereal seeds, oil seeds, grass seeds, vegetable seeds, fruit seeds, legume seeds, seeds of roots and tubers, sugar crop seeds, seeds of trees, seeds of ornamental plants, nut seeds, and industrial crop seeds.

81. The process according to claim 80, wherein said seeds are cereal seeds.

82. The process according to claim 81, wherein said cereal seeds are selected from the group consisting of barley, buckwheat, canarygrass, maize, millet, oats, rice, rye, sundangrass, sorghum, sesame, triticale, and wheat.

83. The process according to claim 82, wherein said cereal seeds are wheat seeds.

84. The process according to claim 78, comprising introducing said encapsulated vegetation enhancement agent and said seeds into a plant growth media.

85. The process according to claim 84, wherein said plant growth media is a member selected from the group consisting of water, sand, vermiculite, peat, perlite, soil and mixtures thereof.

86. The process according to claim 85, wherein said plant growth media is soil.

87. The process according to claim 86, wherein said encapsulated vegetation enhancement agent is introduced into said soil prior to a subsequent planting of said seeds.

88. The process according to claim 87, wherein said encapsulated vegetation enhancement agent is introduced into said soil in the Fall of a year prior to planting said seeds in the Spring of the following year.

89. The process according to claim 86, wherein said soil is a high moisture level soil wherein said moisture level exceeds 22 kPa during at least 50% of the growing season.

90. The process according to claim 86, wherein said encapsulated vegetation enhancement agent is introduced into said soil in the Fall of a year during which said seeds are planted.

91. The process according to claim 86, wherein said vegetable matter has a physiological need for nitrogen and said introduction of said encapsulated vegetation enhancement agent supplies nitrogen at a sufficient rate in timing of release to satisfy said physiological need for nitrogen of said wheat throughout the growing season.

92. The process according to claim 91, wherein said seeds are cereal seeds and said introduction of said encapsulated vegetation enhancement agent supplies nitrogen at a rate and timing of release essentially coincident with applications of fertilizer prescribed under a standard intensive cereal management program (ICM) thereby eliminating the need for multiple fertilizer applications.

93. The process according to claim 86, wherein said encapsulated vegetation enhancement agent is applied to said soil at a rate which is at least 10% less than a fertilizer rate determined by a standard soil testing method as being required for said seeds in said soil.

94. The process according to claim 93, wherein said rate is as much as 50% less than said fertilizer rate.

95. The process according to claim 94, wherein said rate is within the range of 10 to 20% less than said fertilization rate.

96. The process according to claim 86, wherein said encapsulated vegetation enhancement agent and said seeds are introduced during a single agricultural step to said soil, so as to eliminate the need for post emergence application of vegetation enhancement agents.

97. The process according to claim 96, wherein said vegetation enhancement agent and said seeds are introduced substantially simultaneously into said soil so as to stimulate emergence of said seeds.

98. The process according to claim 97, wherein said encapsulated vegetation enhancement agent is introduced to said soil to supply nitrogen at a rate in excess of 25 kg/ha, sulfur at a rate in excess of 15 kg/ha, and phosphorous at a rate in excess of 30 kg/ha without burning said or preventing subsequent emergence of said seeds.

99. The process according to claim 66, wherein said vegetation enhancement agent is in the form of a vegetation enhancement composite comprising a member selected from the group consisting of at least one macronutrient, nitrogen fertilizer including a member selected from the group consisting of an inhibitor of urease and an inhibitor of nitrification activity, slow release fertilizer and mixtures of at least one macronutrient, micronutrient, nitrogen fertilizer including a member selected from the group consisting of an inhibitor of urease, and an inhibitor of nitrification activity and slow release fertilizer, and at least one first film comprising said sulfonated polymer coating said vegetation enhancement agent.

100. The method according to claim 99, wherein said first film essentially completely encapsulates said vegetation enhancement agent.

* * * * *